United States Patent [19]

Barnes

[11] 4,374,428
[45] Feb. 15, 1983

[54] EXPANDABLE FIFO SYSTEM

[75] Inventor: Kerry B. Barnes, Collingswood, N.J.

[73] Assignee: RCA Corporation, New York, N.Y.

[21] Appl. No.: 91,526

[22] Filed: Nov. 5, 1979

[51] Int. Cl.³ .................. G11C 9/00; G11C 9/02; G11C 21/00
[52] U.S. Cl. ................................................. 364/900
[58] Field of Search ... 364/200 MS File, 900 MS File

[56] References Cited

U.S. PATENT DOCUMENTS

| | | | |
|---|---|---|---|
| 3,300,724 | 1/1967 | Cutala | 328/37 |
| 3,344,406 | 9/1967 | Vinal | 364/900 |
| 3,646,526 | 2/1972 | Fagan et al. | 340/173 R |
| 3,781,821 | 12/1973 | Roth | 340/172.5 |
| 3,838,345 | 9/1974 | Snyder | 328/37 |
| 3,916,323 | 10/1975 | Moriyama et al. | 328/37 |
| 3,943,347 | 3/1976 | Martinson | 235/152 |
| 3,972,034 | 7/1976 | Derickson et al. | 340/173 R |
| 3,988,601 | 10/1976 | Perry | 235/92 SH |
| 4,040,026 | 8/1977 | Gernelle | 364/200 |
| 4,058,773 | 11/1977 | Clark | 328/37 |
| 4,125,870 | 11/1978 | Suzuki et al. | 364/900 |
| 4,138,732 | 2/1979 | Suzuki et al. | 364/900 |
| 4,143,326 | 3/1979 | Heitman | 328/55 |
| 4,149,245 | 4/1979 | Gannon et al. | 364/200 |
| 4,151,598 | 4/1979 | Webster | 364/900 |
| 4,151,609 | 4/1979 | Moss | 365/221 |
| 4,161,778 | 7/1979 | Getson et al. | 364/200 |

Primary Examiner—Gareth D. Shaw
Assistant Examiner—John G. Mills
Attorney, Agent, or Firm—Samuel Cohen; Joseph S. Tripoli; Donald W. Phillion

[57] ABSTRACT

A FIFO system comprising an expandable number of identical FIFO chips identically interconnected to form a ring with each FIFO chip comprising a RAM memory with inboard and outboard pointing logic which, when activated, direct the writing or readout of words into or out of successive memory locations of each RAM. Each FIFO chip further comprises border transfer logic which connects each FIFO chip with the immediately preceding FIFO chip in the ring and is responsive to the writing or reading of a word into or out of the last memory location of the preceding FIFO chip memory to activate the inboard or outboard pointing logic, respectively, of each FIFO chip, and further is responsive to the writing or reading of a word into or out of the last memory location of each FIFO chip to deactivate the inboard or outboard pointer logic, respectively, of said FIFO chip.

9 Claims, 52 Drawing Figures

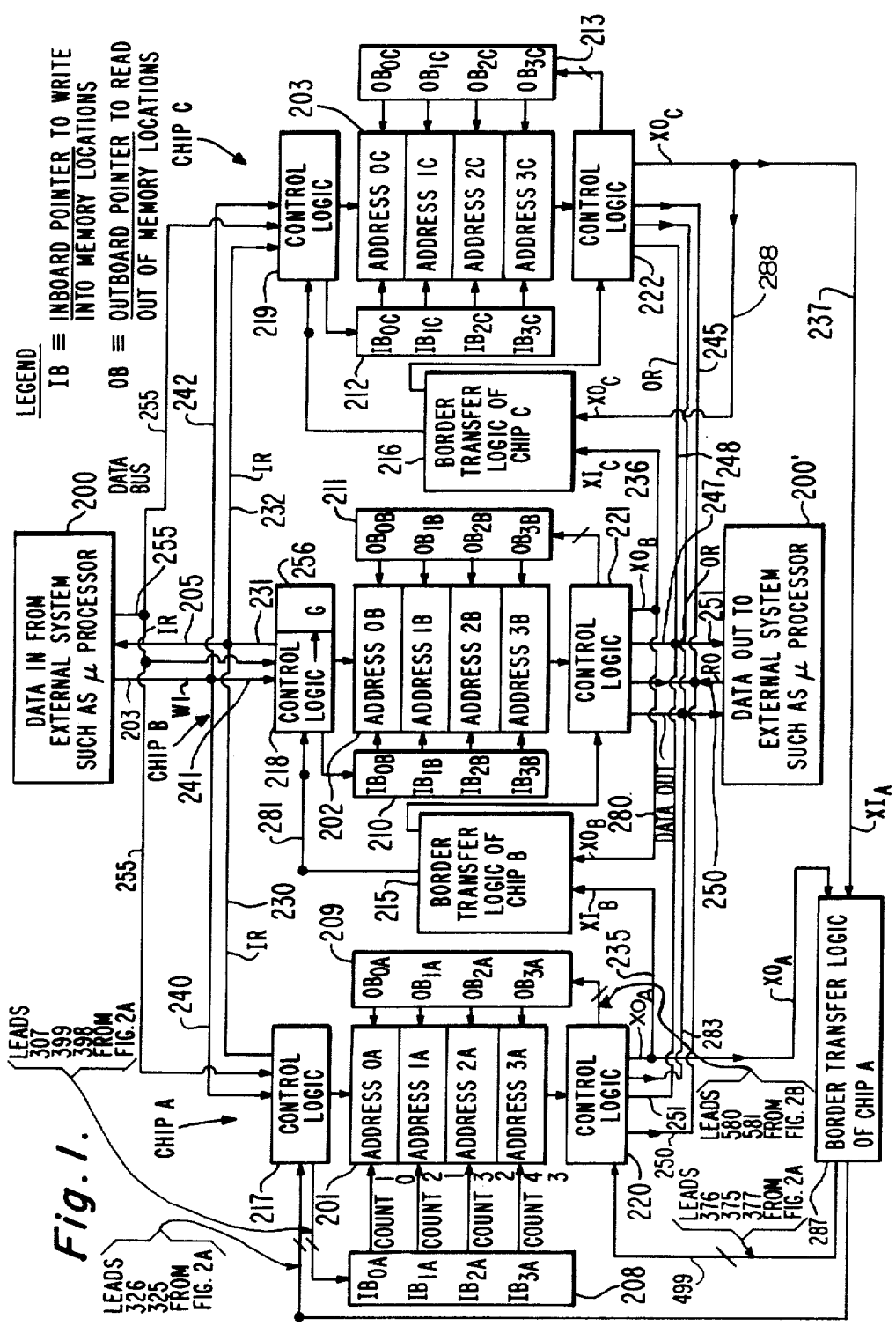

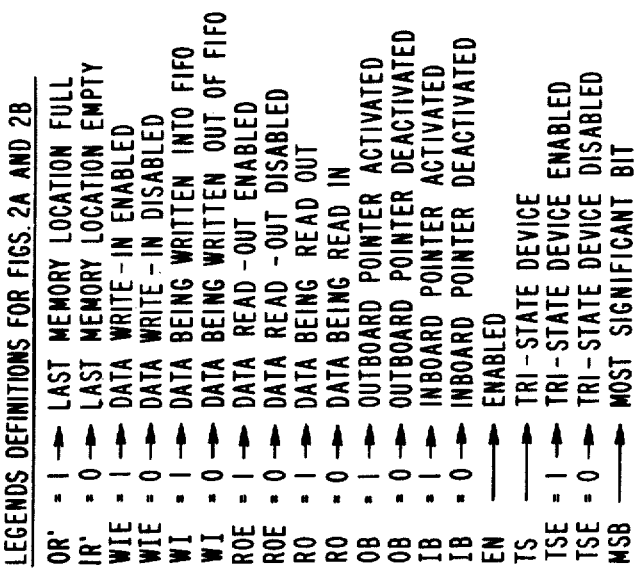
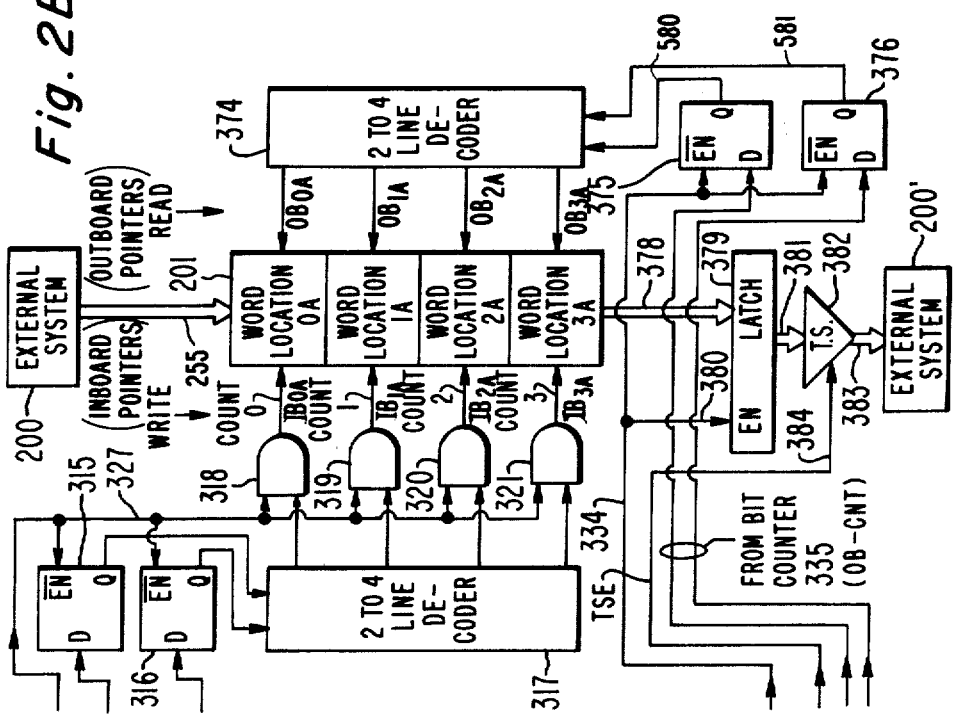

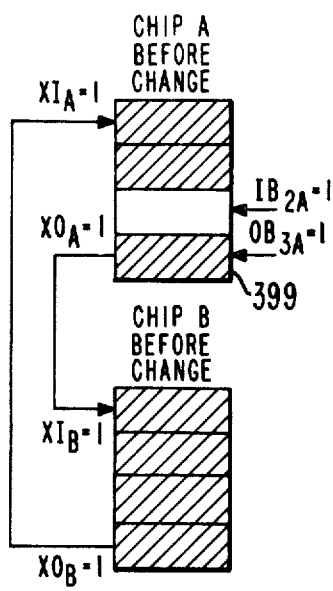
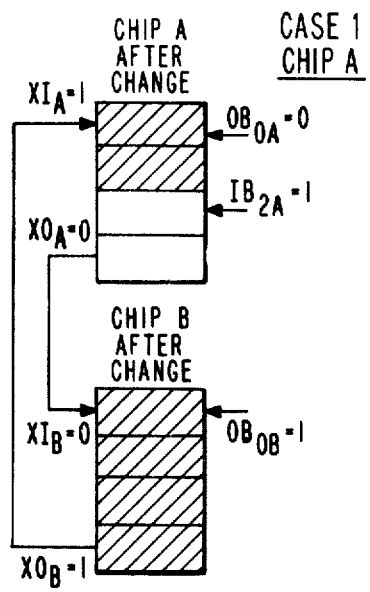
Fig.12A.  Fig.12B.
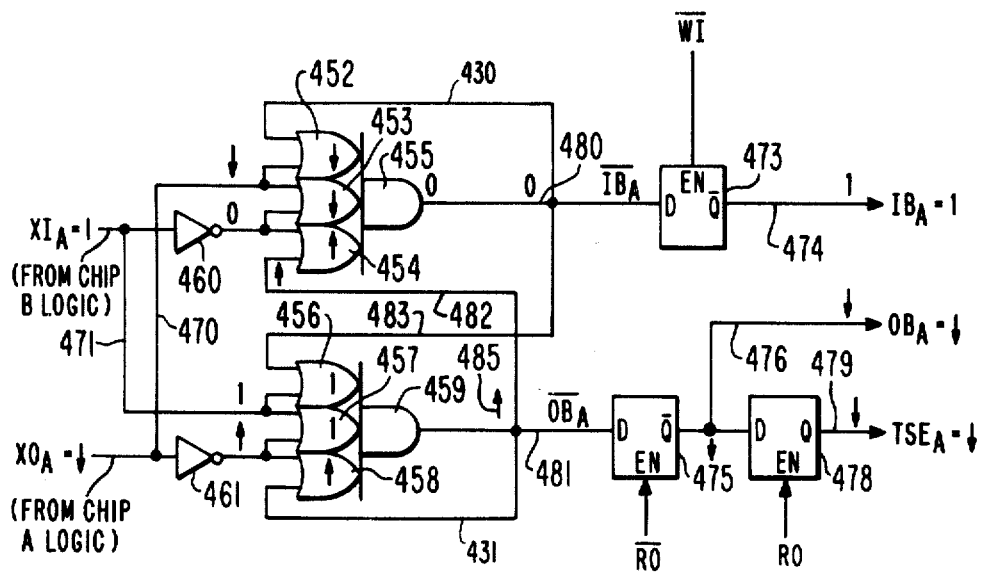
Fig.12C.

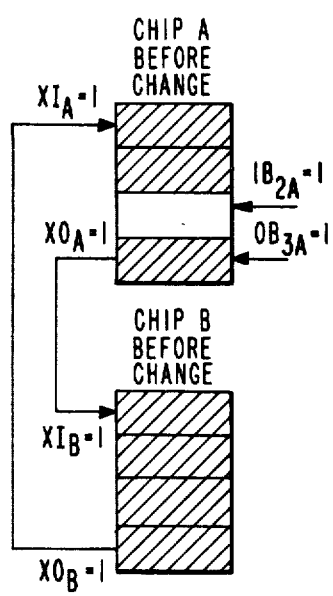
Fig. 13A.
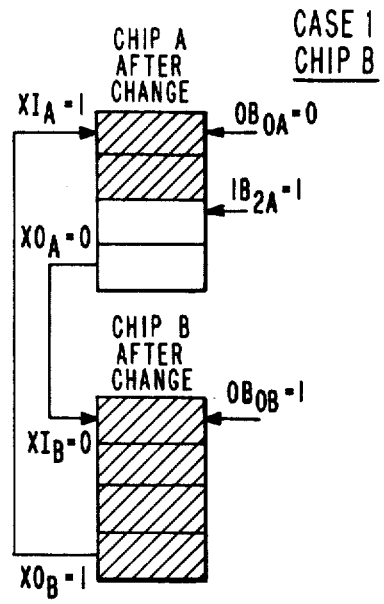
Fig. 13B.
| CASE 1 CHIP B | |
|---|---|
| GIVEN | RESULT |
| $XI_B = 1$ | 0 |
| $XO_B = 1$ | 1 |
| $IB_B = 0$ | 0 |
| $OB_B = 0$ | 1 |
| $TSE_B = 0$ | 1 |
Fig. 13D.
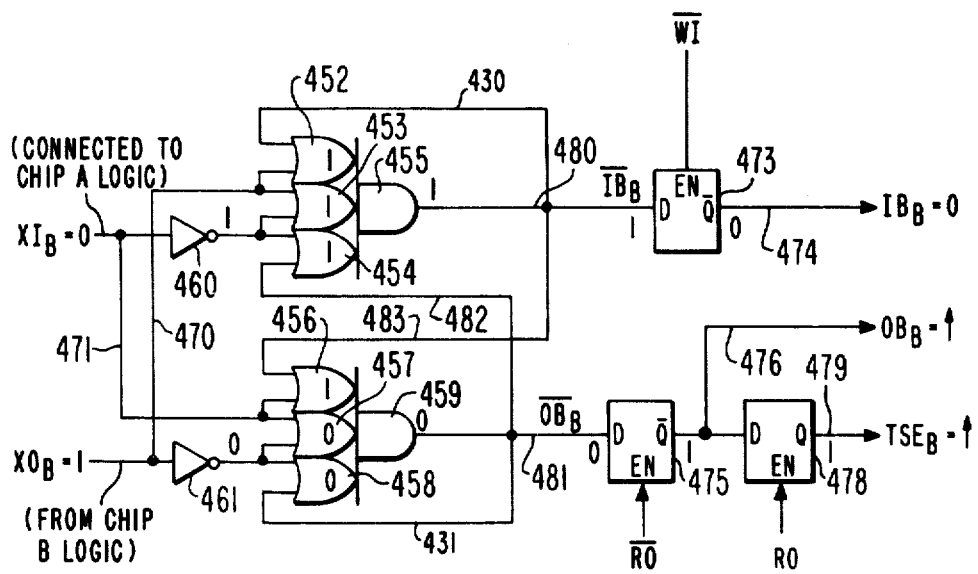
Fig. 13C.

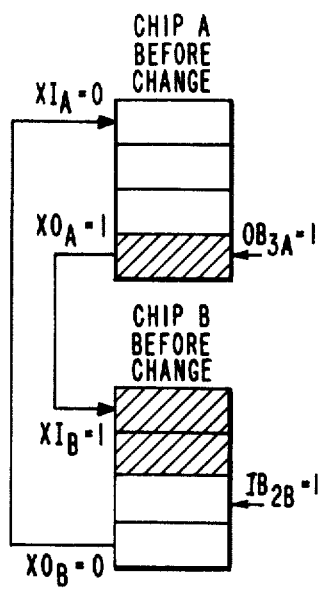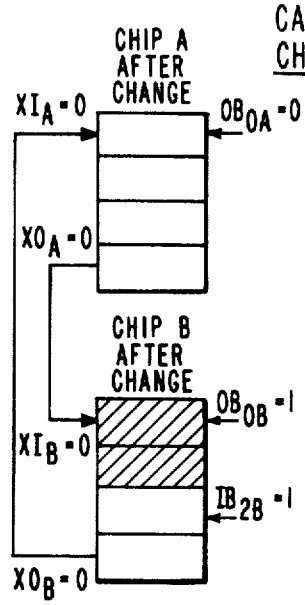
Fig.14A.   Fig.14B.   Fig.14D.
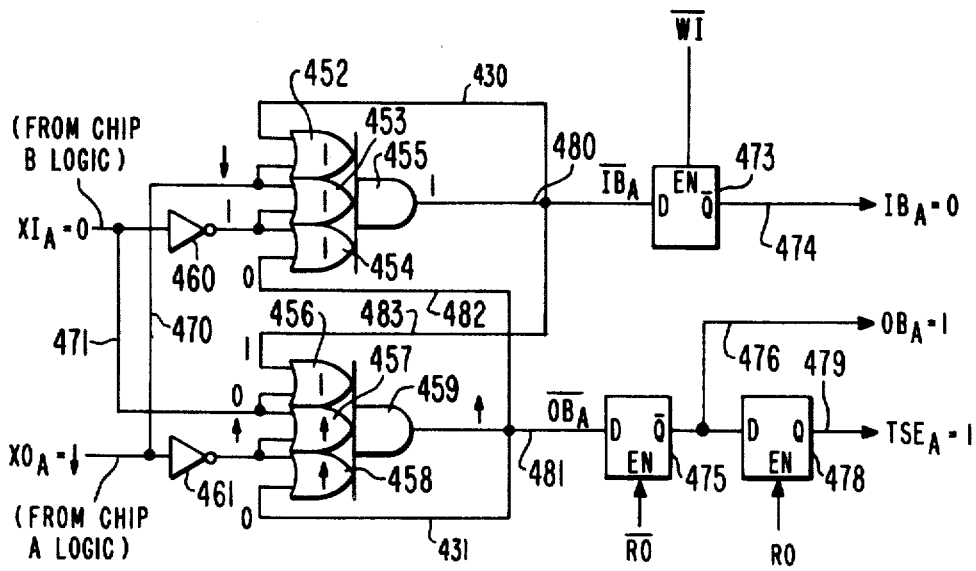
Fig.14C.

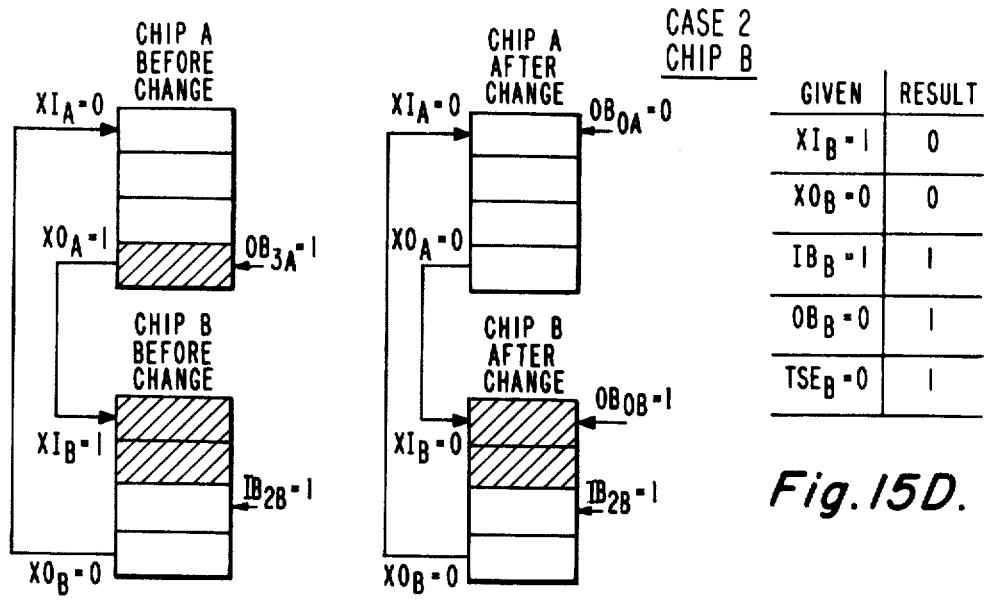
*Fig.15A.* *Fig.15B.* *Fig.15D.*
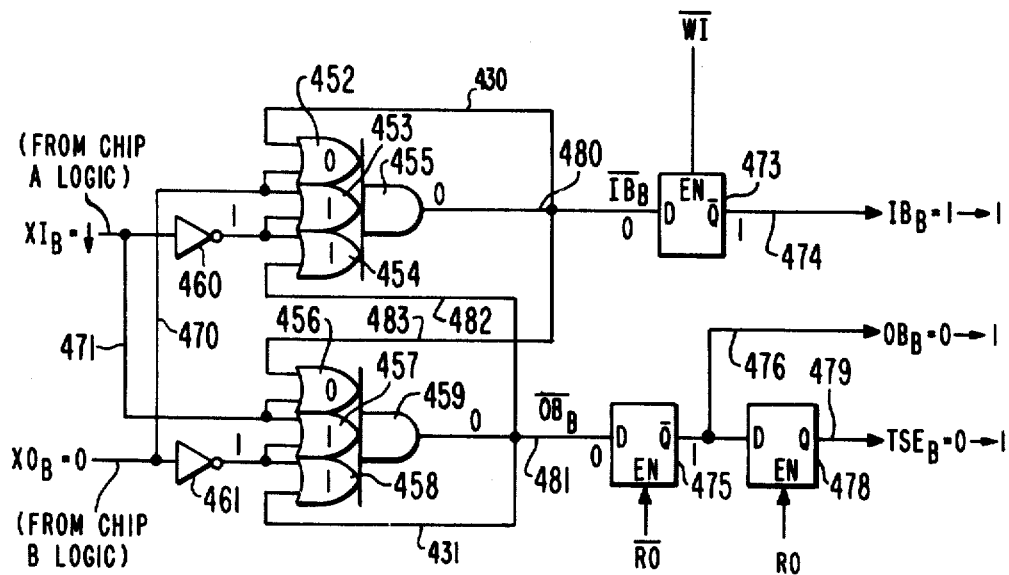
*Fig.15C.*

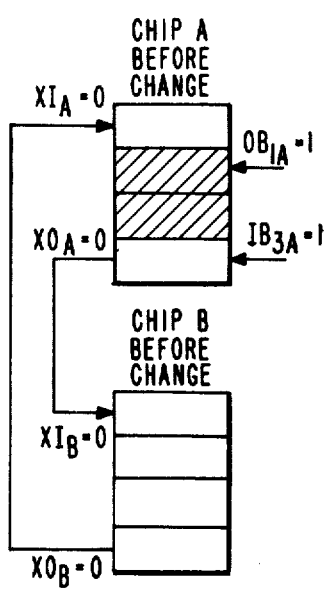
Fig.16A.
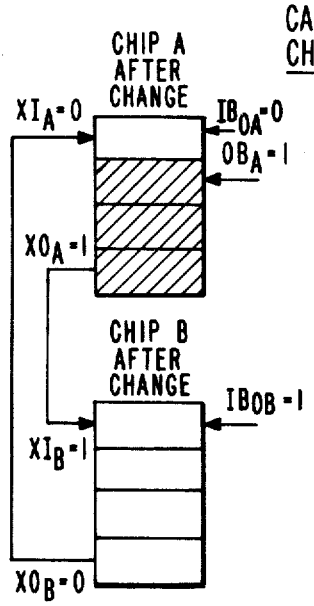
Fig.16B.
CASE 3
CHIP A
| GIVEN | RESULT |
|---|---|
| $XI_A = 0$ | 0 |
| $XO_A = 0$ | 1 |
| $IB_A = 1$ | 0 |
| $OB_A = 1$ | 1 |
| $TSE_A = 1$ | 1 |
Fig.16D.
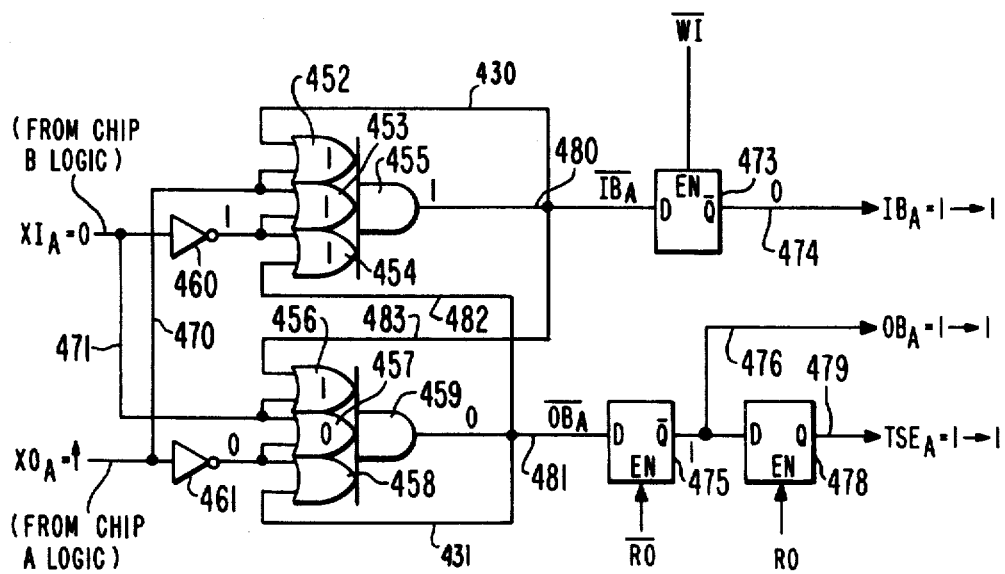
Fig.16C.

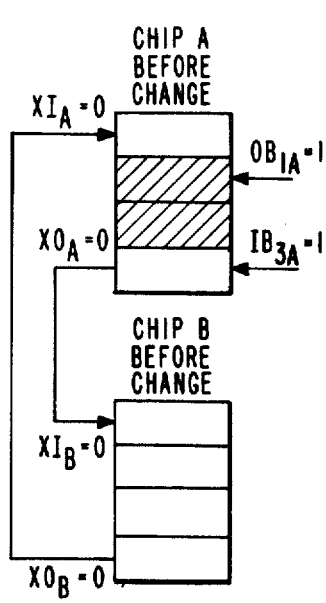
Fig. 17A.
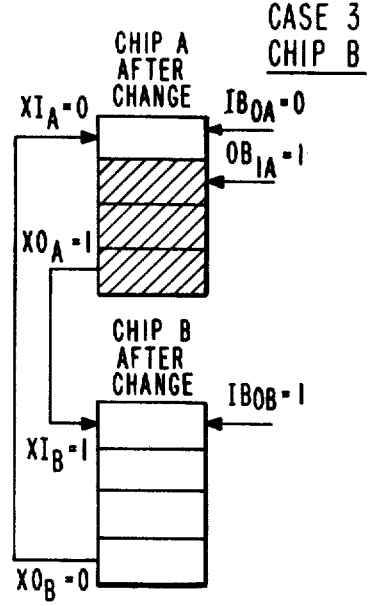
Fig. 17B.
| CASE 3 CHIP B | |
|---|---|
| GIVEN | RESULT |
| $XI_B = 0$ | 1 |
| $XO_B = 0$ | 0 |
| $IB_B = 0$ | 1 |
| $OB_B = 0$ | 0 |
| $TSE_B = 0$ | 0 |
Fig. 17D.
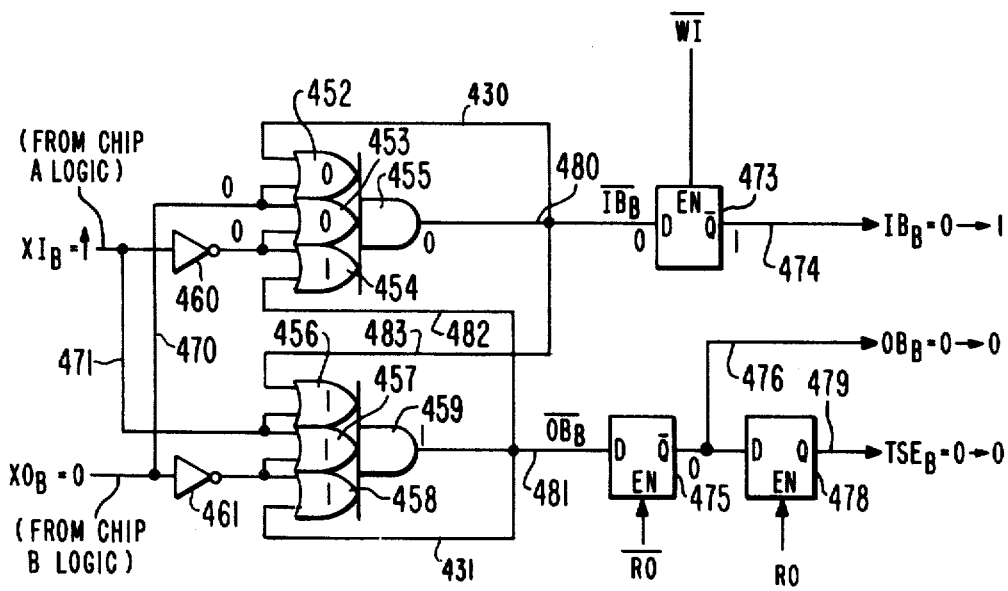
Fig. 17C.

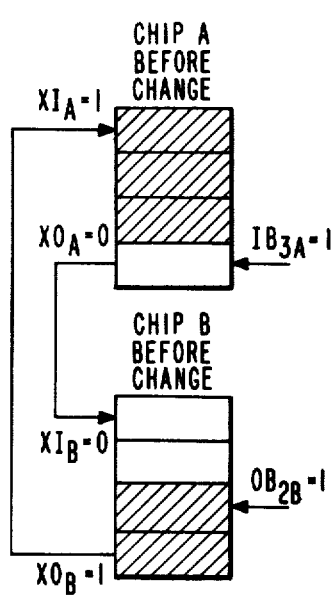
Fig.18A.
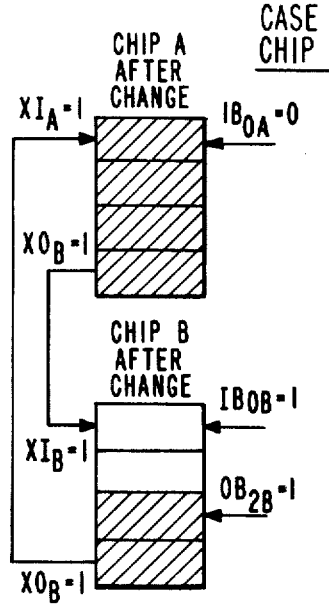
Fig.18B.
CASE 4
CHIP A
| GIVEN | RESULT |
|---|---|
| $XI_A = 1$ | 1 |
| $XO_A = 0$ | 1 |
| $IB_A = 1$ | 0 |
| $OB_A = 0$ | 0 |
| $TSE_A = 0$ | 0 |
Fig.18D.
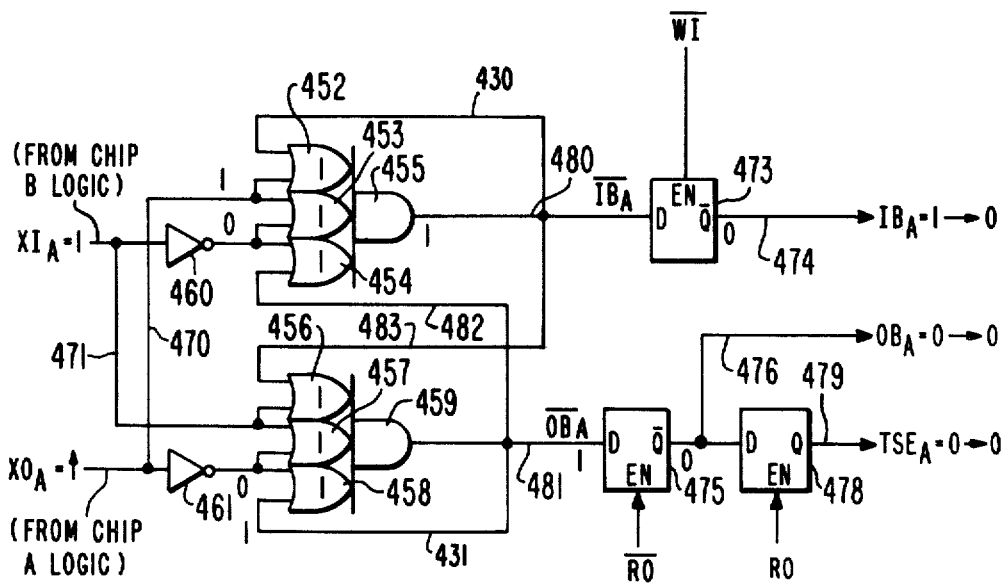
Fig.18C.

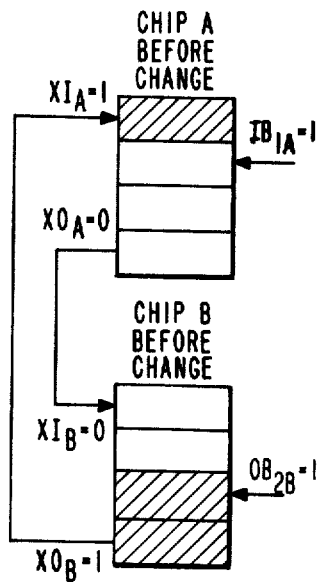
Fig.21A.
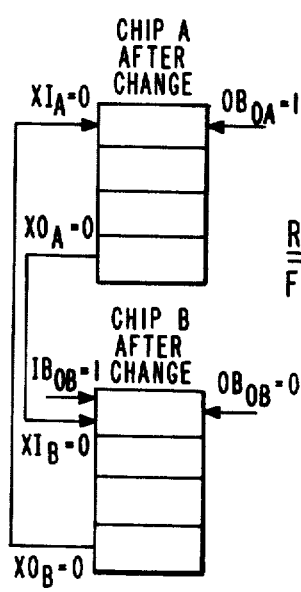
Fig.21B.
CASE 10
CHIP B AND ALL OTHER CHIPS
| GIVEN | RESULT |
|---|---|
| $XI_B = 0$ | 0 |
| $XO_B = 1$ | 0 |
| $IB_B = 1$ | 0 |
| $OB_B = 0$ | 0 |
| $TSE = 0$ | 0 |
| $FC = 1$ | 1 |
| RS = ⎍ | |
RESET
$FC = 1$
Fig.21D.
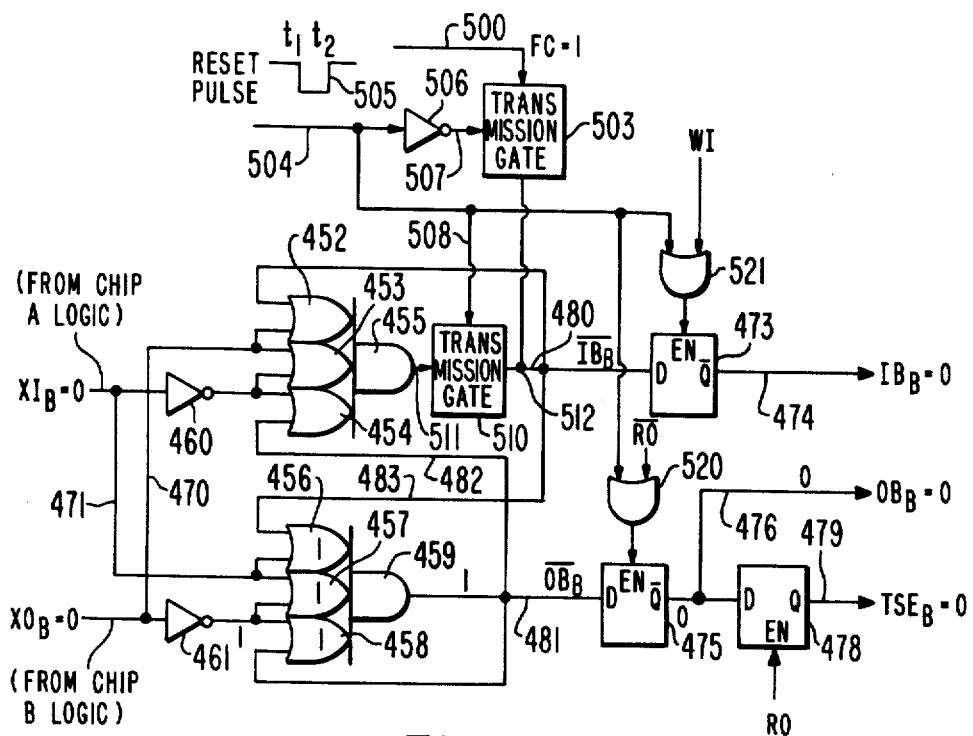
Fig.21C.

EXPANDABLE FIFO SYSTEM

The United States Government has rights to this invention pursuant to Government Contract No. u/F33615-77-C-1224 awarded by the U.S. Air Force.

The invention relates generally to memory queues employed in data processors of various types and more particularly it relates to a memory queue known as a FIFO, (First In First Out), in which data, such as addresses, is first stored therein and then read therefrom, with the stored data being read out in the same order as it was stored.

A FIFO is essentially a data buffer in which data is shifted out in the same chronological order as it was shifted in with the shifting in and shifting out operations typically being asynchronous, thereby enabling the transfer of data between asynchronous devices. There are two principal types of FIFO's currently in use. The first type is expandable in that additional memory location can be added. In the operation of the first type, the first word to be stored is entered into the first memory location and then automatically ripples down to the last empty memory location which in an initially completely empty FIFO would be the last memory location. The second word stored is entered into the first location and then ripples down until it comes to the last empty word location and then stops, thereby becoming stored in the second from last location in the bank of memory (word) locations.

When a word is read out of the memory, it is read out from the bottom of the memory bank, which would be the first word written into the FIFO. The second word would then ripple into the now empty last memory location of the FIFO.

If, in the meantime, additional words have been written into the FIFO, they would have rippled down into locations beginning from the third memory location from the bottom of the last location in the FIFO. Thus, when the first word written was read out of the last location thereof there would be a rippling effect running up the FIFO from the last memory location caused by the moving down of each word in succession into the next lower word location of the FIFO. It is apparent that this type FIFO can be expanded simply by increasing the number of memory locations.

The second type FIFO currently in use is not easily expandable. It consists of a bank of memory locations of N memory locations. The first word written into the FIFO is written into the first memory or word location. The second word is written into the second memory location. The third word is written into the third location and so on with the Nth word being written into the Nth word location.

The first word read out of the FIFO is read out from the first location, which was the first word written therein. The second word read out is read out from the second memory location, which was the second word written into the FIFO. In summary, a word written in this second type FIFO remains in that location until it is read out from the FIFO, as opposed to the rippling effect of the first type FIFO briefly described above.

The obstacles to expanding the second type FIFO is the manner in which a word (memory) location and the words stored therein are identified. Both for writing into the FIFO and for reading out of the FIFO counters are employed. Specifically a first counter, identified herein as the inboard (IB) counter, is employed to write words into the FIFO. Thus, when the first counter contains the count of zero the first word will be written into the first location of the FIFO. After the first word is written into the FIFO, the first counter advances its count from zero to one, so that the next word written into the FIFO will be written into the second word location. Similarly, after each subsequent word is written into the FIFO the IB counter is incremented by one to point to the next word location.

When the first counter reaches a count of N, the FIFO is then full and unless words have been read therefrom it can receive no more words.

A matter of terminology should be clarified at this point. While the memory locations are now being referred to as the first word location, the second word location, etc., for convenience purposes, such word locations will be referred to later herein as word location 0, word location 1, etc., to correspond to the counts of a binary counter in which the 0th count is in fact the first count position.

Words are read from second type FIFO by means of a second counter identified as the outboard (OB) counter in that it reads word from the FIFO. The outboard counter initially has a count of zero and points to the first word location in the FIFO and when the external system, which can be a data processor, calls for a word to be read from the FIFO the OB counter will read the word in the first word location of the FIFO and then will advance from the count of zero to the count of one. Thus, when the external system calls for a second word to be read from the FIFO the OB counter will be pointing to the second word location and the second word will be read therefrom, which was the second word written into the FIFO.

Thus, the inboard (IB) counter must always precede the outboard (OB) counter if there are any words stored in the FIFO. When the IB counter reaches its full count it will write a word into the Nth position of the FIFO and then will return to the count of zero so that next word will be written into the first word location of the FIFO, assuming that the first location is now empty, the first word initially written therein having been read out.

When the outboard counter catches up to the inboard counter, this means that all of the words written into the FIFO by the inboard counter have been read therefrom by the outboard counter. On the other hand, when the inboard counter catches up to the outboard counter it means that inboard counter has in effect lapped the outboard counter and the FIFO is now full of words and can accept no more words until at least one is read therefrom.

Various logic means are required to monitor the inboard and outboard counters and to determine the state of the FIFO. Because of the IB and OB counters and the fixed word capacity, this second type FIFO is not expandable although it has the obvious advantages of no rippling effect since each word remains in the location in which it was written until it is read out of the FIFO.

In accordance with one preferred embodiment of the invention, there is providing a FIFO system comprising an expandable number of FIFO chips arranged in a ring with each FIFO chip comprising a RAM memory with inboard and outboard pointing logic which, when activated, directs the writing or readout of words into or out of successive memory locations of each RAM. Each FIFO chip further comprises border transfer logic which connects each FIFO chip with the immediately preceding FIFO chip in the ring and is responsive to the writing or reading of a word into or out of the last memory location of the peceding FIFO chip memory to activate the inboard or outboard pointing logic, respectively, of the succeeding FIFO chip, and further is responsive to the writing or reading of a word into or out of the last memory location of each FIFO chip to deactivate the inboard or outboard pointer logic, respectively, of each FIFO chip.

In the drawing:

FIG. 1 is a simplified block diagram of the overall system to illustrate the basic principles of the system;

FIGS. 2A and 2B form a combined Figure, referred to herein as FIG. 2, which is a combined block and logic diagram showing a single FIFO chip and control logic for writing or reading from the word locations;

FIG. 3 shows how FIGS. 2A and 2B fit together to form the combined Figure referred to herein as FIG. 2;

FIGS. 12A and 12B show one of the eight possible states of a two chip expandable FIFO system before and after a word is transferred out of the last word location of one of the FIFO chips (chip A) into the other FIFO chip (chip B);

FIG. 12C shows the border transfer logic and its operation in transferring the inboard and outboard pointers during the transfer of a word out of the last location of FIFO A chip as shown in FIGS. 12A and 12B;

FIG. 12D is a chart showing the changes occurring in the border transfer logic of FIG. 12C;

FIGS. 13A–13D correspond generally to FIGS. 12A–12D except that FIGS. 13A–13D relate to the states of chip B before and after a word is transferred from the last word location of chip A into the first word location of chip B. FIG. 13C shows the border transfer logic and its operation for such a transfer.

FIGS. 14A through 19D are six groups of four figures each which show the other six possible states of the FIFOs (three for chip A and cases 2, 3, and 4 of FIG. 5 and three for chip B) with words being transferred either into or out of the last position of one of the chips in the FIFO system and with the inboard and outboard pointers in various relationships with each other;

FIGS. 20A through 20D show the status of the border transfer logic of the FIFO chip selected for word storage at the beginning of operation of the system; and FIGS. 21A through 21D show the status of the border transfer of those logic FIFO chips not selected for word storage at the beginning of operation of the system.

The subject matter of the present invention is organized generally in the following manner:

I. GENERAL DISCUSSION OF INVENTION (FIGS. 5-11)
II. DISCUSSION OF GENERAL SYSTEM LOGIC (FIG. 1)
III. DISCUSSION OF DETAILED LOGIC OF A SINGLE FIFO CHIP (FIGS. 2A AND 2B)
IV. DISCUSSION OF INBOARD CONTROL LOGIC (FIGS. 3 AND 4)
V. DISCUSSION OF OUTBOARD CONTROL LOGIC (FIGS. 3 AND 4)
IV. DISCUSSION OF BORDER TRANSFER LOGIC CORRESPONDING TO THE EIGHT CASES OF FIG. 5 (FIG. 12A–FIG. 19D)
VII. DISCUSSION OF BORDER TRANSFER LOGIC RE THE INITIATION OF OPERATION OF THE SYSTEM (FIG. 20A–FIG. 21D)

Before discussing the logic (including the border transfer logic) employed to implement the invention, a general discussion of the invention will be set forth using the diagrams of FIGS. 5 through 11 which show various conditions of emptiness and fullness of the several FIFOs employed in the overall system and what happens when a word is written into or read from the system under such various conditions.

Figure 5:
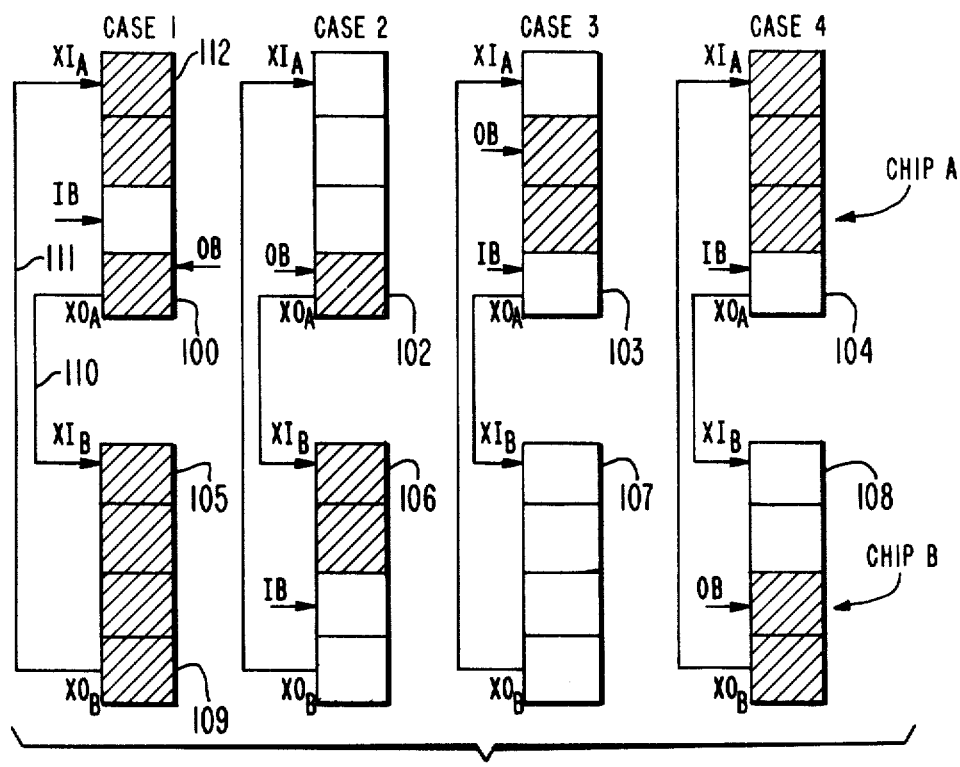
FIG. 5 shows the eight possible permutations of locations of the inboard and outboard counters in the system.

For example, the four pairs of rectangular blocks of FIG. 5 each represent a two chip FIFO with each FIFO chip containing 4 address locations and with the two chips of each pair having different conditions of emptiness (a blank word location) and fullness (a cross-hatched word location) and different relative positions of the inboard pointer and the outboard pointer (basically counters as discussed briefly above). While each chip has its own inboard and outboard control logic and its own IB and OB pointers, only one inboard pointer and one outboard pointer in the entire system will be activated at any given time and not necessarily in the same chips.

It is necessary to monitor the location of the active inboard pointer and outboard pointer and to determine when either the IB pointer or OB pointer transfers from one FIFO chip to the next FIFO chip, and also to determine when the inboard pointer catches up to the outboard pointer or the outboard pointer catches up the inboard pointer which indicates either a condition of complete emptiness or complete fullness of the entire FIFO system.

Consider first the monitoring of the IB and the OB pointer to determine when either passes from one FIFO chip to the next FIFO chip. Such a transfer of either the IB or OB pointer occurs only when a word is written into or read from the last address location of a FIFO chip. The four cases of FIG. 5 show four different conditions of a two chip FIFO system, the two chip FIFO system including chip A and chip B. In each case a word is being transferred out of the last word location or a word is being transferred into the last location of chip A. Specifically in cases 1 and 2 in FIG. 5 a word is being transferred out of the last location of chip A and in cases 3 and 4 a word is being transferred into the last word location of chip A.

Since only one of the inboard pointers and one of the outboard pointers can be energized to point to only one word location in the entire FIFO system at any given time, the detection of the transfer of a pointer from one FIFO chip to another is of paramount importance since whichever word location the IB or OB pointer points to is the word location to or from which a word will be written or read.

The specific logic including the border transfer logic, by which the energized IB and OB pointers are transferred from one chip to the next in each of the four cases shown in FIG. 5 will be discussed in detail in FIGS. 12A through 19D along with diagrams showing the status of chips A and B before and after the change in each of the four cases shown in FIG. 5. The interaction between chip A and chip B is completely symmetrical and, as will be discussed in detail later in connection with FIGS. 1, 6, and 7, the FIFO chips are connected together to form a ring with the last chip being connected to the first in exactly the same manner as the first is connected to the second and the second to the third, and so on.

The ring configuration can be seen in an elementary form in case 1 of FIG. 5 where the lead 110 extends from the last address position 100 of chip A to the first address location 105 of chip B. The output from word location 100 is labelled $XO_A$ and has a voltage level representing the state of the last word location 100 of chip A. If $XO_A$ is a binary 1 (high level voltage), then the last word location 100 is filled. If $XO_A$ is a binary zero (low level voltage), then word location 100 is empty. Terminal $XI_B$, associated with the first word location 105, always assumes the same level as $XO_A$, and is connected to appropriate logic defined herein as border transfer logic (not shown in FIG. 5 but which is shown in FIGS. 13C, 14C, 15C, 16C, 17C, 18C and 19C responding to various states of the system) which recognizes the state of the last word location 100 of chip A at all times and prepares chip B either to activate its inboard (IB) pointer or outboard (OB) pointer depending on whether the last word location 100 in chip A has just become filled or has just become empty.

A similar connection extends from terminal $XO_B$ of chip B, indicative of the condition of the last word location 109 of chip B, to terminal $XI_A$ of chip A, where border transfer logic (such as shown in FIG. 13C) detects a change in the condition of the last word location 109 of chip B and transfers either the (active) inboard or the (active) outboard pointer to the first address location of chip A. Chip A of case 1 will be discussed in more detail later re FIGS. 12A–12D, and chip B of case 1 will be discussed in more detail later re FIGS. 13A–13D.

Case 2 of FIG. 5 shows the outboard pointer (OB) pointing to the last position 102 of chip A and the inboard pointer pointing to the position shown in Chip B, with all the word locations between OB and IB filled with words. The transfer of the word out of the last location 102 of chip A will move OB from chip A to chip B by border transfer logic which will be shown and described in detail later herein in FIGS. 14A–14D and FIGS. 15A–15D.

Case 3 of FIG. 5 shows both the IB pointer and the outboard pointer OB in chip A with the address locations therebetween filled with words. When another word is added to chip A the inboard pointer will move from chip A to chip B and point to the first address location 107 thereof as will be discussed in more detail later herein in connection with FIGS. 16A–17D.

In case 4 of FIG. 5 the IB pointer points to the last memory location 104 of chip A which is empty and the OB pointer points to a location in chip B, as shown.

When a word is written into chip A it will be entered into the last location 104 and the point IB will move from chip A to the first word location 108 at chip B. The logic which performs the foregoing transfer is shown in FIGS. 18A–19D and will be discussed later herein.

It is to be understood that both FIFO chip A and FIFO chip B have associated therewith their own separate counters which function to generate the inboard and outboard pointers independently of each other. The transfer of either the inboard or outboard pointer from a first chip to the next chip means that the inboard or outboard pointer logic of the first chip has been inactivated and the inboard or outboard point logic of the next chip has been activated.

Figure 6:
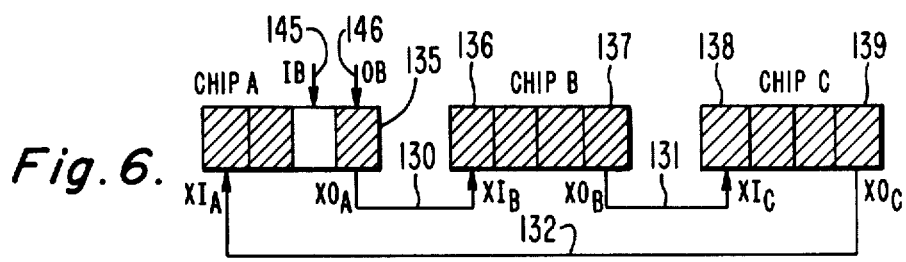
FIGS. 6 and 7 are simplified showings of three single chip FIFO systems and illustrate the full or empty condition of the third chip when the active inboard and outboard pointers point to the other two FIFO chips.

As indicated above, the FIFO system of the present invention is expandable. FIG. 6 shows a simplified expansion of Case 1 of FIG. 5 by an additional chip C. Again the border transfer logic and control logic is not shown. The interconnections now extend from the $XO_A$ terminal, associated by logic (not shown) with the last address location 135 of chip A, to the $XI_B$ terminal of chip B associated by logic (not shown) with the first location 136 thereof. The $XO_B$ terminal of chip B is connected through lead 131 to the $XI_C$ terminal of chip C, and the $XO_C$ terminal of chip C is associated with the $XI_A$ terminal of chip A. As discussed above, the XO terminals are associated through logic to be described later with the last word locations of the chip from which they originate and the XI terminals are associated through logic to be described later with the first word locations of the chip to which they are connected. Thus, in FIG. 6 the XO terminals of chips B and C are associated with the last word locations 137 and 139 thereof and the XI terminals of chips B and C are associated with the first word locations 136 and 138 thereof.

It will be noted that the addition of chip C changes nothing except the capacity of the FIFO system. The single word location between the inboard pointer 145 and the outboard pointer 146 remains empty and all of the remaining word locations are filled. If a fourth chip were added to the system between chip C and chip A it also would have all its word locations filled since pointer IB precedes pointer OB. In other words, no words can be transferred out of the system by outboard pointer 146 until they have been entered into the FIFO by inboard pointer 145 which has already passed through chips B and C in FIG. 7 and has returned to chip A and entered words into the first two word locations thereof.

If one more word is entered into the FIFO system of FIG. 6 then IB pointer 145 will have caught up with OB 146 indicating that the FIFO is full and can accept no more words. The logic which detects such filling of the FIFO and provides the proper signals indicating that no more words can be entered into the FIFO is shown in FIG. 2 and will be discussed in detail later herein.

Figure 7:
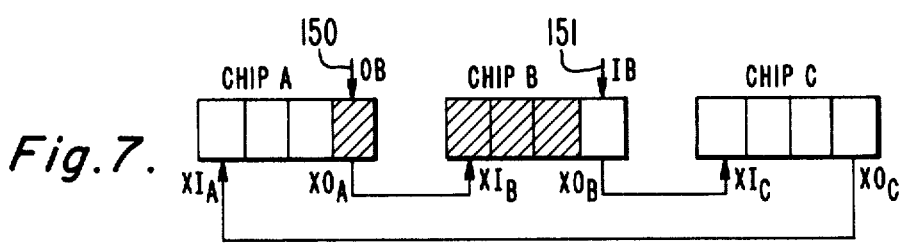

Referring now to FIG. 7 there is shown another simplified example of adding a third chip C to a FIFO system, specifically the system shown in case 2 of FIG. 5. The OB pointer 150 and IB pointer 151 maintain their same positions in chips A and B as shown in Case 2 of FIG. 5 will all of the word locations positioned therebetween being filled with words and all of the remaining word locations being empty since again IB pointer 151 must lead OB pointer 150. The addition of chip C changes nothing except increasing the capacity of the FIFO system. All of the word locations of chip C will be empty since IB has not yet progressed that far. If another chip D were added between chip C and chip A it also would consist entirely of empty word locations.

Figure 8:
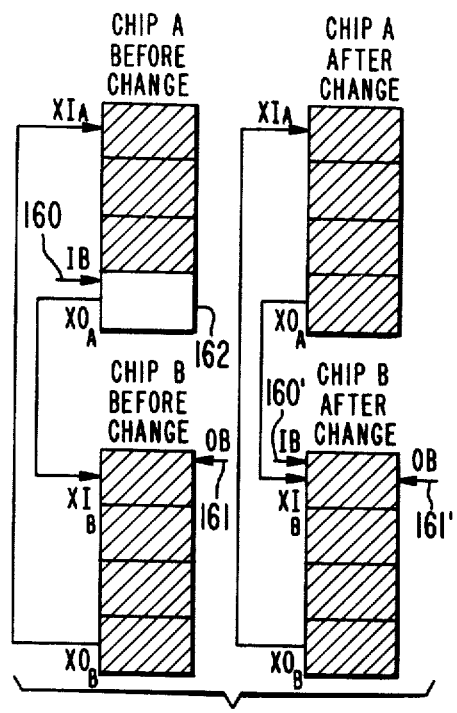
FIGS. 8 and 9 are simplified showings of the filling the of the FIFO system to its storage capacity when it occurs in the last word location of a FIFO chip and when it occurs in a different word location on a FIFO chip.
Figure 9:
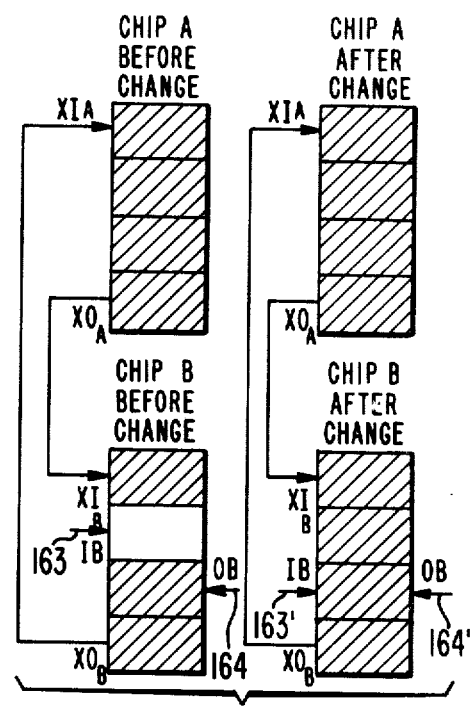

Consider now FIG. 8 which shows at the left the condition of chip A and chip B as the inboard pointer 160 is is about to catch up with the outboard pointer 161 when one more word is entered into the last address position 162 of chip A. The result of such "catching up" is shown at the right in FIG. 8. IB pointer 160' has caught up with OB pointer 161'. Logic is provided in FIG. 2 to detect that the FIFO is full and prevents the writing of any more words therein. The logic of FIG. 2 will be disccussed later herein.

The inboard pointer 163 can catch up to the outboard pointer in any location, not only at the transition of the inboard pointer from one chip to another. As shown at the left in FIG. 9 both the inboard pointer 163 and the outboard pointer 164 are located in chip B with one empty space word location existing therebetween. After one more word is written into the system, the inboard pointer 163' will have caught up to the outboard pointer 164 as shown at the right in FIG. 9.

Figure 10:
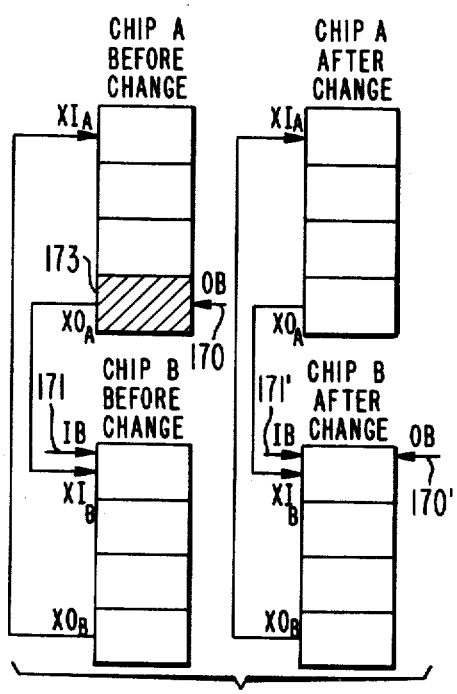
FIGS. 10 and 11 are simplified showings of the emptying of the FIFO system storage capacity when it occurs in the last word location of a FIFO chip and when it occurs in a different word location on a FIFO chip.
Figure 11:
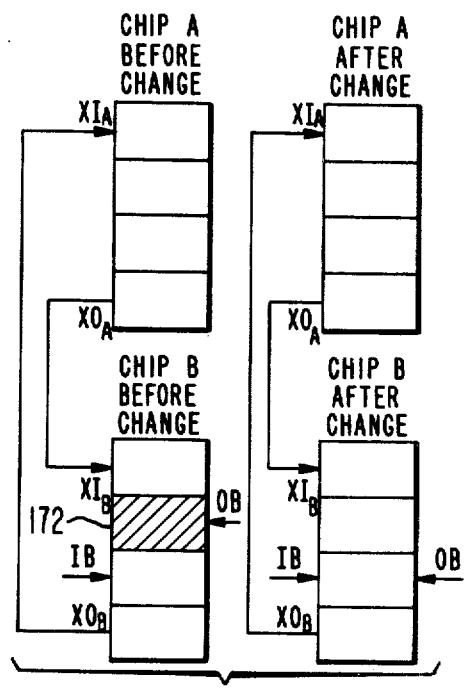

It is also possible for the outboard pointer to catch up to the inboard pointer which indicates that the FIFO is completely empty. Such a condition is shown in FIGS. 10 and 11. FIG. 10 shows such a condition occurring when the outboard pointer 170 transfers from one FIFO chip to another and FIG. 11 illustrates such a condition occurring within a single chip. Referring now to the left half of FIG. 10, the outboard pointer 170 points to the last word location 173 of chip A and the inboard pointer 171 points to the first word location of chip B with only the last word location 173 of chip A separating the outboard pointer 170 and the inboard pointer 171. Thus, when the word is read out of the last word location 173 of chip A the outboard pointer 170' will have caught with the inboard pointer 171' as shown in the right hand portion of FIG. 10.

The outboard pointer can catch up to the inboard pointer at any point in any given chip, not only when the word is being transferred out of the last location of a given chip. For example, as shown in the left half of FIG. 11 both the outboard pointer OB and the inboard pointer IB are active in chip B with one word location 172 separating the inboard and outboard pointers. When the word in word location 172 is read therefrom the outboard pointer OB will have caught with the inboard pointer IB as shown in the right half of FIG. 11, and boths chips A and B are completely empty.

The logic for detecting and indicating that the outboard pointer has caught with the inboard pointer, as mentioned above, will be discussed later herein in connection with the logic of FIG. 2.

II. DISCUSSION OF GENERAL SYSTEM LOGIC (FIG. 1)

Referring now to FIG. 1 there is shown a generalized block diagram of the system including three FIFO chips A, B, and C, each having four word locations. For example, chip A has word locations 0A through 3A, chip B has word locations 0B through 3B, and chip C has word locations 0C through 3C.

Also shown in FIG. 1 are control logic means, inboard pointer means, outboard pointer means, and border transfer logic. For example, associated with chip A are control means 217 and 220 which in fact, form a single control means as will become more evident in the description of FIG. 2. However, for purposes of convenience in discussing FIG. 1 the control means are separated into two portions 217 and 220. Similar arrangements are employed in connection with chips B and C.

Chip A also has associated therewith inboard pointer means 208 and outboard pointer means 209 which respectively point to word locations into which a word is to be written and to word locations from which a word is to be read. Chip B has corresponding inboard and outboard pointer means 210 and 211 and chip C has corresponding inboard pointer means 212 and outboard pointer means 213. All of the inboard and outboard pointer means are controlled by separate shift-in (write in) counter means or shift-out (read out) counter means contained in the control logic, such as the control logic blocks 217 and 220 of chip A.

When the operation of the device is first initiated all of the word locations of all chips are empty and the initially activated inboard pointer 208 and outboard pointer 209 point to the word location (address) 0A of chip A. Thus, when operation is first initiated, the first word will be written into the first word location 0A to chip A. At this point it should noted that both the writing-in (WI) and reading-out (RO) of words into the FIFO occur as a result of instructions from an external system which can be a microprocessor, for example. Such external system is shown as two systems 200 and 200', one at the top of FIG. 1 and the other at the bottom of FIG. 1. The two external systems 200 and 200' can be a single system. Two external systems are shown for purposes of expediencey in explaining the basic concepts of the invention in FIG. 1.

In shifting words into the system, two conditions must be met to conform to the operational requirements of the external system 200, 200'. The first condition is that an input ready (IR) signal must be present on lead 205 from one of the control logic means 217, 218 or 219 associated with chips A,B, or C indicating that there is in fact an empty word location into which a word can be shifted. The input ready lead 205 is connected to various control logic blocks 217, 218, and 219 via leads 230, 231, and 232. Further, the input ready signal will be generated only by that chip in which the inboard pointer logic is activated, which means that such chip does in fact contain an empty word location to which the active inboard pointer is pointing. When the external processor 200 is ready to shift a word into the FIFO system it will supply a write in (WI) signal on lead 203 which is also connected to control logic blocks 217, 218 and 219 of chips A, B, and C via leads 240, 241, and 242, respectively.

As will be discussed later in connection with FIG. 2, the FIFO is now ready to receive, via bus 255, the word which is to be written into that particular word location to which the active inboard pointer is pointing. As stated above, the first word to be shifted into the system goes into word location 0A of chip A to which active inboard pointer 208 is pointing.

After the first word is shifted into address location 0A, the inboard counter logic within block 217 will cause the pointer 208 to point to word location 1A so that the next word shifted into the system will go into said word location 1A. The next two words shifted into the system will enter word locations 2A and 3A of chip A as the inboard pointer 208 points respectively to the word locations 2A and 3A.

When the fifth word is written into the system it must be transferred into the first word location 0B of chip B. Therefore, the inboard pointer 208 of chip A must be disabled and the inboard pointer 210 of chip B must be enabled. Specifically, when the last word location 3A of chip A is filled with a word, the inboard pointer logic of chip A is disabled and the inboard pointer logic of chip B is enabled to point to word location 0B so that fifth word is shifted into the address 0B of chip B.

The logic which controls the enablement and disablement of the inboard logic of all of the chips is contained within border transfer logic such as border transfer logic 215, 216 and 217 which connects each chip to the adjacent chip.

In a general sense, the border transfer logic between chips detects the writing into or reading from the last word location of a given chip, informs the next subsequent chip of such event, and enables the said next subsequent chip to either receive a word in its first word location by means of the enablement of its inboard pointer logic or to read a word from its first word location by means of the enablement of its outboard pointer logic.

As discussed generally re FIGS. 6 and 7 the three chips A, B, and C and the border transfer logic blocks 215, 216, and 217 form a cyclical ring of alternate chips and border transfer logic. Specifically the $XO_A$ output of control logic 220 of chip A is connected directly to border transfer logic 287, resident in chip A, and also directly to the $XI_B$ terminal of border transfer logic 215, resident in the next chip B; the $XO_B$ output of control logic 221 of chip B is connected directly to the $XO_B$ terminal of border transfer logic 215, resident in chip B, and also directly to the $XI_C$ terminal of border transfer logic 216, resident in the next chip C; and the $XO_C$ output of control logic 222 of chip C is connected directly to border transfer logic 216, resident in chip C, and also directly to the $XI_A$ terminal of border transfer logic 287, resident in chip A.

Returning again to the operation of the system, as the sixth, seventh, and eighth words are entered into the system from external source 200 the word locations 1B, 2B, and 3B of chip B will be filled. When the last word location of chip B becomes full a signal is generated within control logic 221 which appears on terminal $XO_B$ of chip B and is supplied to border transfer logic 216 which responds thereto to transfer the active inboard pointer from chip B to chip C. The $XO_B$ signal from chip B is also supplied to border transfer logic 215 through lead 280 which then deactivates the inboard pointer logic 210 of chip B through lead 281.

When the inboard pointer 212 functions to enter a word in the last word location 3C of chip C, a signal is generated within control logic 222 and supplied to its $XO_C$ output terminal and then to border transfer logic blocks 287 and 216 via leads 237 and 238. Border transfer logic 287 then completes the cycle and activates the inboard pointer logic 208 of chip A to point again at word location 0A of chip A. As additional words are written into the system the cycle described above repeats.

It will be noted that each of the border transfer logic blocks 215, 216, and 287 are related to both of the two chips they connect. The precise relationship of the border transfer logic between any two chips will become clearer in connection with the discussion of FIGS. 12A through 19D.

The border transfer logic not only monitors the inboard pointer logic means 208, 210, 212 but also monitors the outboard pointer logic means 209, 211 and 213 which are associated respectively with chips A, B, and C. As discussed above, the function of the outboard pointer logic means 209, 211 and 213 is primarily to point to the next address in a given one of the chips 201-203 from which a word is to be read. Obviously a word cannot be read from the system until one is written into it. When the operation of the system is first initiated all of the word locations are empty and both the IB pointer and the OB pointer point to the first word location of the particular chip which is selected upon resetting of the system to its initial conditions. It has been assumed that this chip is chip A so that both IB pointer 208 and OB pointer 209 point to address 0A of chip C. After a word is written into word location 0A it can then be read therefrom by means including outboard pointer logic 209. As long as the active IB pointer remains ahead of the outboard pointer, regardless of which of the three chips A, B, or C contain the active IB or OB pointers, the output ready (OR) signal will be at its high level indicating that a word can be read from the system. It is only when the OB pointer catches up to the IB pointer that all the words written into the system have been read therefrom and the system is completely empty of words. As discussed above, the logic to indicate an empty FIFO condition will be described later herein re FIG. 2.

Conversely, the IB pointer can be so far ahead of the OB pointer that it will completely lap the OB pointer and become three chips ahead of the outboard pointer, thereby catching up to the outboard pointer which means that all of the word locations in three chips A, B, and C are full and that no more words can be written into the FIFO. Here again, the logic required to recognize a full FIFO is shown in FIG. 2 and will be described later.

Data is outputted from this system via bus 283 to external system 200' in response to a read out (RO) signal on read out lead 250. It will be noted that RO lead 250 is connected to the three control logic blocks 220, 221, and 222 of FIFO chips A, B, and C, respectively, via leads 243, 244, and 254, respectively, so that words can be read from any of three chips A, B, or C depending upon which of said three chips contains the activated OB pointer.

However, no word can be read from the FIFO system unless an output ready (OR) signal is present on lead 251. It will be noted that the output ready signal lead 251 is connected to all of three control logic blocks 220, 221 and 222 via leads 246, 247 and 248 so that regardless of which one of FIFO chips A, B, or C contains the active outboard pointer a word will be transferred out of a word location into the external system 200' via bus 283.

III. DISCUSSION OF A DETAILED LOGIC OF A SINGLE FIFO CHIP (FIGS. 2A AND 2B)

Figure 2A:
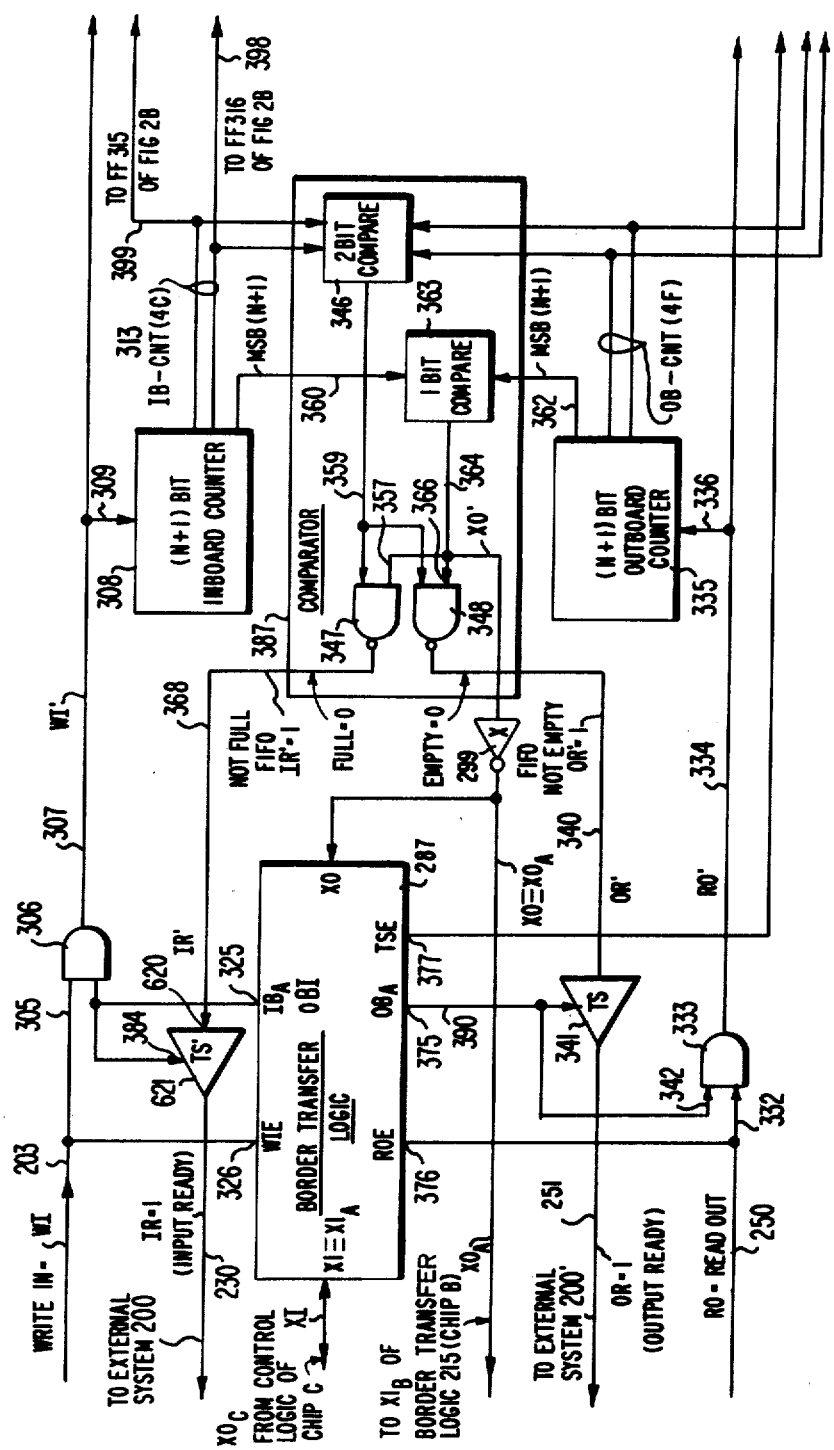

Turning now to FIGS. 2A and 2B, which has been referred to above, there is shown the logic of a single FIFO chip corresponding, for example, to chip A of FIG. 1.

Included in FIG. 2 as part of the chip is border transfer logic 287 which is employed in transferring the active IB or OB pointers from the previous chip C (FIG. 1) to chip A, when required as will be discussed in detail later. Transfer of the active IB or OB pointers from chip A to chip B, when required, is effected primarily by means of border transfer logic 215 shown in FIG. 1, and from chip B to chip C by border transfer logic 216.

The remaining logic of FIG. 2 is herein defined as control logic and includes the logic corresponding to the control logic blocks 217 and 220 of FIG. 1 and the pointer control logic blocks 208 and 209 of FIG. 1.

The IB and OB pointers $IB_{0A}$-$IB_{3A}$ and $OB_{0A}$-$OB_{3A}$ of memory 201 (FIG. 2B) are generated in IB and OB pointer logic 208 and 209 of FIG. 1 to point selectively to the word locations 0A-3A of RAM 201 (in chip A).

The control logic as defined above establishes the relationship between the status of the IB and OB pointers re the address locations of RAM memory 201 with respect to the border transfer logic and indicates to the border transfer logic when any one of several happenings occur. One such happening is the determination by the control logic as to when the memory 101 becomes completely full or completely empty so that the system will known that no more words can be entered into memory 101, or if it is empty, no more words can be read therefrom. The control logic also detects when the last word location of the memory 201 changes to cause the transfer of either the active OB pointer or the active IB pointer to the next adjacent chip in cooperation with and through the border transfer logic 215 as will be discussed in detail re FIGS. 12A-19D.

Thus, to transfer an active IB or OB pointer into a given chip A requires information from the logic of the previous chip C and to transfer an active IB or OB pointer to the next following chip B requires the transmission of information, namely $XO_A$ to the border transfer logic 215 of said next adjacent chip B.

To facilitate a comparison of FIG. 1 with FIGS. 2A and 2B, corresponding components thereof, particularly leads, have been identified with the same reference characters. In some cases, what appears to be a single lead in FIG. 1 represents several leads in FIG. 2 and is so indicated by a short line drawn transversely across such single lead representing a multiple connection and with the corresponding leads of FIG. 2 listed in brackets alongside such single lead in FIG. 1 with an arrow pointing to the single lead which represents such multiple leads of FIG. 2.

Thus, for example, the output connection 599 from border transfer logic 287 in FIG. 1 actually represents leads 376, 375 and 377 shown in FIG. 2A.

Assume that the FIFO chip memory 201 of FIG. 2B contains four word locations although it can, in fact, contain many more with additional pointing logic. Further, assume that address locations 0A and 1A are full and that address locations 2A and 3A are empty so that words can either be written into memory 201 or read therefrom.

Assume further, that the external system, which can be the microprocessor 200-200' of FIG. 1, is instructed to write a word into memory 201, which word will be written into address location 2A since locations 0A and 1A are already full. Assume still further that the IB pointer is activated in chip A so that the IB terminal 325 in border transfer logic 287 is at a high level.

In order to write information into memory block 201 AND gate 306 (FIG. 2A) must be enabled and input ready (IR) lead 230 (FIG. 2A) must be at a high level. IR lead 230 will be high when tri-state device 621 of FIG. 2A is enabled to produce a high level signal (a binary one) on IR terminal 230. In order to produce a high output signal on IR lead 230 from tri-state device 621 both IR' lead 620 and inboard (IB) control lead 384 must be high.

The logic which determines whether IR lead 230 is high or low requires a consideration of the comparator logic within block 387 which determines whether the FIFO memory 201 is full or empty. If it is only partially full, then IR' 368 will be a binary 1 which means that memory 201 can accept a word which occurs by means of logic to be now described.

The counter 308 contains the count of the number of words shifted into FIFO memory 201 which, in the example being discussed, can be a total of four. However, the counter 308 actually has three bit positions rather than the two required to point to the four word locations of memory 201. Similarly, counter 335 counts the number of words read from the memory 201 and also is comprised of three bit positions, one more than is required to point to the four word locations of memory 201.

The third bit position (the most significant bit position) in each of the counters 308 and 335 are compared in the one bit comparator 363. The first two bits of counters 308 and 335 are compared in the two bit comparator 346. If the two bit comparator 346 registers coincidence between the counts of counters 308 and 335 such coincidence indicates that the inboard pointer and the outboard pointer point to the same address in memory 201.

The one bit comparator 363, which compares the third bit position of counters 308 and 335, indicates whether memory 201 is full or empty (assuming coincidence of the contents of the first two bit positions, also). More specifically, coincidence of the third bit positions of counters 308 and 336, i.e. when both positions contain either a binary 0 or a binary 1, indicates that the outboard pointer has caught up with the inboard pointer, the condition which occurs when all word locations in memory 201 are empty.

The lack of coincidence between the third bit positions of counters 308 and 335 indicates that the inboard pointer has gone completely through the four word locations of memory 201 and then has returned to the first word location 0A and then to 1A until it has caught up with the outboard pointer, indicating that all four word locations in memory 201 are full.

The truth of the foregoing becomes more evident when it is fully appreciated that the outboard pointer cannot advance if there is no word in the next position to which it is pointing. The outboard pointer must necessarily follow the inboard pointer around the loop, that is the word locations 0A through 3A, and then again and again through word locations 0A through 3A indefinitely.

Assume as an example that the inboard pointer 317 has written words into the four word locations 0A through 3A and then has returned to word location 0A and has entered a word in location 0A previously emptied by the outboard pointer 374. The remaining three word locations 1A, 2A and 3A are full with the outboard pointer 374 also pointing to word location 1A.

Since the inboard pointer 317 has cycled completely through the four word locations of memory 201 and returned to the first word location 0A the third bit position of counter 308, which controls the IB pointer, will contain a binary 1 since the IB pointer 317 has transferred from the last address 3A back to the first address 0A. After a new word is written into address location 0A, the IB pointer will then point to address location 1A, the same word location the outboard pointer 374 is pointing to. However, the third bit position of counter 335, which controls the OB pointer, contains a binary 0 since the OB pointer has not passed through all of the four word locations in memory 201. The NAND gate 347 will then be enabled through leads 359 and 357 from comparators 346 and 363 to output a binary 0, indicating the FIFO is full and can accept no more words. If the FIFO were not full the output of NAND gate 347 would be a binary 1 which would activate a tri-state device 321 and inform external system 200 that a word could be written into the FIFO system.

It is also possible that the third bit position of the outboard counter 335 can contain a binary 1 and the third bit position of the inboard counter can contain a binary 0, a second condition which indicates that the FIFO is full. The foregoing occurs as follows. Assume the outboard pointer reads the words from word location 1A, 2A, and 3A of chip 201 and then returns to point to word location 0A, which will cause the third bit position of outboard counter 335 to contain a binary 1. Then assume the inboard pointer 317 writes words into word locations 1A, 2A, and 3A for the second time, thereby passing through all of the word locations of memory 201 for the second time, and then returns to point to word location 0A. Thus, the inboard pointer will have caught up with the outboard pointer. However, when the inboard pointer transferred from word location 3A back to word location 0A the contents of the third binary bit position of inboard counter 308 changed to a binary zero. On the other hand, the outboard counter 335, which controls the outboard pointer logic 317, is also pointing to address position 0A, but has a binary 1 in its third bit position. In summary, both the inboard and outboard pointers have each again passed through all four word locations of memory 201 and all four word locations remain filled. However, the contents of the third bit positions of counters 308 and 335 remain non-coincident, although reversed.

Thus, it can be seen that if the two third bit positions of counters 308 and 335 contain opposite binary characters, the output of one bit comparator 363 will be a binary 0 which will be inverted at the input of NAND gate 347 via lead 357. The other input to NAND gate 347 goes high when the least two significant bits of the two binary counters 308 and 335 are the same. Thus, NAND gate 347 will be enabled and a binary 0 outputted therefrom onto OR' lead 340, indicating that memory 201 is full and can accept no more words.

On the other hand, as mentioned above, if the third bit positions of counters 308 and 336 coincide a binary 1 is supplied to one input of NAND gate 348. If the two least bit positions of counters 308 and 335 also coincide, then a binary 1 appears on the output lead 359 of comparator 346 to enable NAND gate 348 via lead 359. When enabled, NAND gate 348 produces a binary 0 on its output lead 340 indicating that FIFO memory 201 is empty and no more words can be read therefrom. When at least one word is present in the FIFO memory 201 the output of NAND gate 348 is a binary 1 indicating that a word can be read therefrom.

The output of the one bit compare circuit 363 also generates the XO' signal which, when inverted by inverter 299, becomes the $XO_A$ signal supplied to the $XI_B$ input of the border transfer logic 215 (shown in FIG. 1) of the next chip B in the following manner. The $XO_A$ output is either a 1 or a 0 indicating that the last word position of memory 201 is either full or empty, respectively.

The rationale is as follows. It is obvious that the OB pointer must follow the IB pointer since the OB pointer cannot outboard any words until they are first read in by the IB pointer. During its first pass through the four memory locations of memory 201, the most significant bit (MSB) of the IB pointer will be a zero as will the MSB of the OB pointer on its first pass through the four memory locations of memory 201 as the words previously written in by the IB pointer are read out.

After such first pass through the four memory locations of memory 201 by the IB and OB pointers the MSB's of the 3-bit counters 308 and 335 of FIG. 2A will become 1's so that the output of one-bit compare circuit 163, after inversion by inverter 299, will be a 0 indicating that the last word location and memory 201 is empty which, in fact, it is since it will not be filled again until the IB pointer reads a word therein. However, as soon as a second word is written in the last memory location 3A of memory 201 the most significant bits of the IB and OB counters 308 and 336 of FIG. 2A will become different (the MSB of the IB counter becoming a 1) so that the output of the one-bit compare circuit 363 will be a 0 which, when inverted by inverter 299, will change the $XO_A$ signal to a high level signal indicating that the last word location in memory 201 is filled.

When the OB pointer reads out the last word from the memory 201 and moves back to point to the first word location 0A its most significant bit will also change from a 1 to a 0. Thus, the MSB's of both the IB and OB counters 308 and 336 of FIG. 2A will again be 0's and the output of the one-bit compare circuit 363 will be a 1 which, when inverted by inverter 299, will become a 0 indicating that the last word location 3A in memory 201 is empty, which is true since the OB pointer logic has just emptied it.

Now when the IB pointer moves down and writes a third word into the last word location 3A of memory 201 during the third pass through of memory 201 the most significant bit of the write-in (IB) counter 308 will change from a 0 back to a 1. IB counter 308 will again be pointing to the first word location 0A in memory 201 in preparation for the next write-in function. The OB pointer, however, has not written a third word into memory location 3A so the MSB of OB counter 335 remains a 0.

Thus, the most significant bits of the IB and OB counters 308 and 335 are different so that the output of the one-bit compare circuit 363 is a 0 which, when inverted by inverter 299 becomes a 1 indicating that the last of memory location 3A or memory 201 is filled.

In summary, it can be seen that when the most significant bits of counters 308 to 335 are different the last memory location in memory 201 is always filled and when the two MSB's are the same, whether 0's or 1's, the last memory location 3A of memory 201 is empty and the $XO_A$ signal is a low level signal.

Now, the border transfer logic 287 associated with chip A will examine the state of the last memory location of the previous chip which, in the system of FIG. 1, will be the $XO_C$ output from chip C and it will also examine the state of the memory location of its own chip which is defined by $XO_A$ in FIG. 2A. It can be seen that $XO_C$ is supplied from chip C and $XO_A$ is supplied from chip A (see FIG. 1) and they are supplied to oppositely positioned terminals of the border transfer logic 287 of FIG. 2A.

If the last location of the chip C memory (memory 203 of FIG. 1) is full, and the last location of the memory 201 of chip A (FIG. 2B) is empty, i.e. $XO_A=0$, then the border control logic 287 of FIG. 2A will know that the active IB counter must lie in chip A and so, through lead 499, energizes the IB counter control logic 217 of chip A which in turn energizes the IB pointer logic 208 of chip A.

On the other hand, if the last memory locations of both chip C and chip A are full, then the logic will know that the active IB pointer lies in some chip other than chip A and will deactivate the IB counter control logic 208 of chip A.

As still another example, if the last word location of the chip C memory is empty and the last word location of the chip A memory is full, then it is obvious that the OB pointer logic 209 is active in the chip A logic so that the border transfer logic will cause such OB pointer logic in the chip A logic to be activated.

On the other hand, if both of the last memory locations in the memories of chip C and chip A are empty then the border transfer logic will know that the activated OB pointer will be in another chip, namely, a chip other than chip A which could be either chip C or chip B.

The border transfer logic for each chip will perform the same function as the border transfer logic 287, as described in connection with chip A, and will determine whether the active OB pointer or IB pointer should be in the associated chip or in another chip.

Returning again to the writing in of a word when FIFO memory 201 is not full, the tri-state device 621 will output a binary 1 since binary 1's are supplied to both its input 620 and also to its other input 384 from energized IB terminal 325 by means within border transfer logic 330, to be discussed later herein. The binary 1 output from tri-state 621, which is the input ready IR signal, is supplied to the external control system, which can be the external microprocessor 200.

Although no direct connections are shown in FIG. 2 between external microprocessor 200 and various leads such as the IR lead 230, the RO lead 250, and the OR lead 251 it is assumed that such terminals are in fact connected to the external microprocessor 200 as shown in FIG. 1.

Returning again to the write-in operation it has now been established how AND gate 306 is enabled. The binary one on IR lead 230 indicates to microprocessor 200 that the FIFO is ready to receive a word. When ready, the microprocessor 200 will supply a WI signal on lead 203 which passes through enabled ANd gate 306 to enable that one of AND gates 318–321 which is already primed by an output signal from 2-to-4 line decoder 317 (FIG. 2A) and thereby transfer a word from the microprocessor system 200 into the particular word location to which the output of the enabled one of AND gates 318, 319, 320, or 321 is pointing, i.e. has a high level binary 1 on its output.

IV. DISCUSSION OF INBOARD CONTROL LOGIC (FIGS. 3 AND 4)

The description will now consider in more detail how the inboard counter 308 of FIG. 2A produces a high level output on the outputs of AND gates 318–321 in successive order, and the timing of such a high level outputs from AND gates 318 through 321 with respect to the transfer of a word from the external system 200 into one of the word locations 0A through 3A to avoid race conditions.

The foreoing can be accomplished by means of a pair of conventional D-type flip-flops 315 and 316 which function as delay means, as will be discussed in detail later, and the 2-to-4 line decoder 317 which transforms the four possible combinations of the Q outputs of the two flip-flops 315 and 316 into counts of 0 through 3.

The operation of counter 308, the two flip-flops 315 and 316, the 2-to-4 line decoder 317, and the four AND gates 318 through 321 can best be explained in connection with the timing diagrams of FIG. 4.

Figure 4:
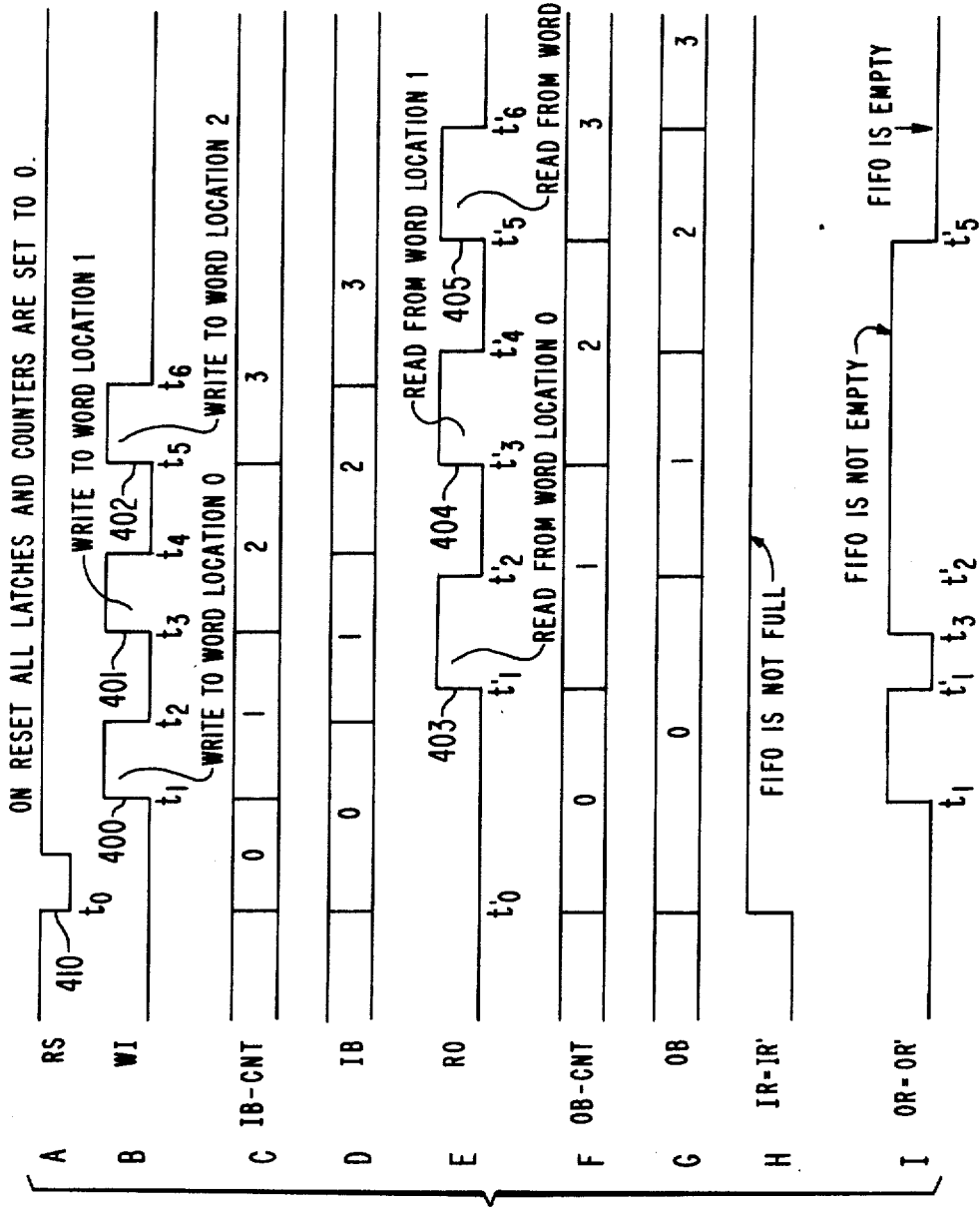
FIG. 4 is a set of waveforms illustrating the operation of the structure of FIGS. 2A and 2B (FIG. 2) as words are written into or read from the single chip FIFO.

The timing diagram of FIG. 4 consists of 9 waveforms marked A through I. For purposes of convenience these waveforms will be identified as waveforms 4A through 3I. Thus, waveform A of FIG. 4 will be identified as waveform 4A. Similarly, waveform B of FIG. 4 will be identified as waveform 4B.

Also, associated with each of the waveforms 4A through 4I are identifying labels. For example, waveform 4A is identified by the letters RS which means "reset." Waveform 4B is identified by the letters WI which means "write-in." Waveform 4C is identified by the letters IB-CNT, which means "inboard count," and is the count of the inboard counter 308 of FIG. 2. Waveform 4F is identified by the letters OB-CNT, which means "outboard count" and is the count of outboard counter 335 of FIG. 2.

Also, for purposes of convenience, the letters associated with the waveforms of FIG. 4 will appear in the logic diagrams and particularly in FIG. 2 at various points indicating that such signal waveform appears at that point in the logic. Thus, the legend IB-CNT (4C) shown at the output of counter 308 in FIG. 2 and indicates that the IB-CNT of counter 308 is shown in waveform 4C.

Returning again to the operation of that portion of FIG. 2 relating to counter 308 and the generation of the inboard pointers at the outputs of AND gates 318 through 321, assume that initially a reset pulse has occurred, as shown in waveform 4A, which resets all of the counters and all of the latches in the logic, including flip-flops 315 and 316, to zero condition. The counter 308 then contains a zero as indicated in waveform 4C at time $t_0$. Sometime later, at time $t_1$, the external system 200 (FIG. 2) generates a write-in signal WI as shown in waveform 4B (assuming that the external system 200 has previously received an input ready IR signal on lead 230 of FIG. 2 indicating that the FIFO can receive a word.

During time $t_0$–$t_1$ (waveform 4C) the counter 308 contains zero count which is a binary 00 so that binary 0's are supplied to the D inputs of both flip-flops 315 and 316 and stored in said flip-flops. The Q outputs of flip-flops 315 and 316, whose count value is shown in waveform 4D, reset to zero at time $t_0$, and do not change as a result of the binary 0's being supplied to the D inputs from counter 308 until time $t_2$, as will become clearer below.

The two binary 0's on the Q outputs of flip-flops 315 and 316 (FIG. 2B) are decoded by decoder 317 to supply a high level binary 1 to one input of AND gate 318. Thus, at time $t_1$ when the positive-going leading edge of the WI pulse 400 of waveform 4B occurs, AND gate 318 will be enabled to supply a binary 1 to word location 0A causing data from the external system to be written into word location 0A.

The IB counter 308 is also incremented by the positive-going leading edge of pulse 400 of waveform 4B, at time $t_1$ to change its output to a binary 001 with the binary 1 being the least significant bit. Assume, for purpose of discussion, that lead 398 of FIG. 2 is connected to the least significant bit position of counter 308 and that lead 399 is connected to the next least significant bit position of counter 308. Therefore, a binary 1 will be supplied to the D input of flip-flop 316 and a binary 0 to the D input of flip-flop 315. The count of binary 1 in counter 308 begins at time $t_1$ and lasts until time $t_3$. However, it is not until time $t_2$ that the output of AND gate 318 goes to its low level and AND gate 319 becomes enabled (see waveform 4D). The disabling of AND gate 318 and enabling of AND gate 319 is caused by the trailing edge of WI pulse 400 which occurs at time $t_2$. Such negative-going trailing edge of pulse 400 is supplied to the $\overline{EN}$ terminals of flip-flops 315 and 316, thereby causing the Q outputs of said flip-flops 315 and 316 to assume the states of the data inputs D which, as discussed above, are respectively binary 0 and binary 1 of flip-flops 315 and 316. Such a combination of binary 0 and binary 1 of the Q outputs of flip-flops 315 and 316 is translated by decoder 317 into a count of binary 1 which primes AND gate 319 but does not enable it. Enabling of AND gate 319 does not occur until time $t_3$ when the positive-going leading edge pulse 401 (waveform 4B) occurs. Enabling of AND gate 319 causes the data word from the external system 200 to be written to memory location 1A.

Also, at time $t_3$ due to the positive-going leading edge of pulse 401 of waveform 4B, the counter 308 of FIG. 2 is incremented by one to assume a count of 2, as indicated in waveform 4C. At time $t_4$, as shown in waveform 4B, the negative-going trailing edge of pulse 401 occurs, which causes the Q outputs of flip-flops 315 and 316 to assume the values supplied to their D inputs from counter 308. The permutation of the Q outputs of flip-flops 315 and 316 are decoded by decoder 317 to prime AND gate 320 at time $t_4$. Then, at time $t_5$, the positive-going leading edge of WI pulse 402 (waveform 4B) occurs and the third word is written into word location 2A from the external system 200.

V. DISCUSSION OF OUTBOARD CONTROL LOGIC (FIGS. 3 AND 4)

It has now been shown how words are written into the FIFO memory 201 of FIG. 2. Next, the transfer from or readout of words from the memory 201 will be considered, again with the aid of the timing waveforms of FIG. 4. First, however, consider the conditions necessary to read a word out of memory 201. It is necessary that a word already be stored in memory 201. As discussed above such a word was stored by the leading edge of write pulse 400 of waveform 4B. Secondly, an output ready OR signal (waveform 4I) must be supplied from the logic of FIG. 2 via lead 385 to the external system 200, indicating that the system is ready to transfer a word therefrom.

In order for an OR signal to appear on lead 385 it is necessary that tri-state device 341 be energized and output a high level signal. Energization of tri-state device 341 is caused by a high level supplied thereto from the OB terminal 375 of border transfer logic 287 through lead 390, and generated by means to be described later. Further, it is necessary that a high level signal be present on OR' lead 340 which indicates that the FIFO is not empty. The high level signal from OB terminal 375 of border transfer logic 287 is also supplied to one terminal 342 of AND gate 333 to prime AND gate 333.

Thus, when a read out (RO) signal is supplied from the external system 200 to the other input 332 of AND gate 333, a high level signal RO, is supplied therefrom to lead 334. The high level signal RO' on lead 334 is shown as occurring at time $t_1'$ in waveform 4E from a low level condition established at time $t_0'$ when the entire system is reset.

It is to be noted that the positive-going leading edge of pulse 403 occurring at time $t_1'$ cannot occur until after time $t_1$ (waveform 4B) when a word is entered into the FIFO upon the occurrence of the positive-going leading edge of write in (WI) pulse 400 of waveform 4B. It is at this time $t_1$ that the output ready (OR) signal of waveform 4I goes high indicating that the system is ready to output (read) a word.

The high level RO' signal appearing on lead 334, is supplied to the enable terminal 380 of latch 379 to transfer the word from word location 0A, pointed to by 2-to-4 line decoder 374, through bus 378, through latch 379, through bus 381, and then through tri-state device 382 to the external system 200', which can be the same system as the external system 200 at the top of FIG. 2.

The tri-state device 382 is energized in the following manner. The output from the TSE terminal 377 of border transfer logic 287 (FIG. 2A) is at a high level for reasons to be discussed later in connection with the description of the border transfer logic 287. Therefore, those leads of bus 381 which are at a high level, binary 1's, will pass such high level signals through tri-state device 382 as high level signals, and those leads of bus 381 which carry low level signals (binary 0's) will pass through tri-state device 382 as binary 0's to external system 200'.

Also, at time $t_1'$, the outboard counter 335 increments from a zero count to a count of one as shown in waveform 4F. However, the state of flip-flops 375 and 376, which correspond to flip-flops 317 and 316 in the write-in logic, do not change states to follow the change of the count of counter 335 until time $t_2'$, which occurs as a result of the negative-going trailing edge of the pulse 403 of waveform 4E. Such negative-going trailing edge is supplied to the $\overline{EN}$ inputs of flip-flops 375 and 376 to transfer the binary data previously supplied to the data input D from counter 335 to the Q outputs of flip-flops 375 and 376. Then, at time $t_2'$, the Q outputs of flip-flops 375 and 376, which reflect the binary count of 01 in bit counter 335, are decoded by 2-to-4 line decoder 374 to point to word location 1A.

Subsequently, when the next positive-going leading edge of the next read out RO pulse 404 (waveform 4E) occurs, the word from location 1A, and now stored in latch 379, will be transferred through tri-state device 382, and to the external system 200' in the same manner as discussed above re-transferring the word from word location 0A to the external system 200'. It is to be noted that between the time $t_1'$ and $t_3'$ a second word had previously been written into word location 1A of the FIFO by means of the leading edge of the WI pulse 401 of waveform 4B.

In a similar manner, the third word stored at time $t_5$ in word location 2A by write-in pulse 402 of waveform 3B can be read out at a later time $t_5'$ by read out pulse 405 of waveform 4E.

The waveform 4H indicates at its low level that the FIFO memory 201 is full and at its high level that the FIFO memory 201 is not full. The waveform 4H appears as the IR' signal on lead 368 of FIG. 2A. The IR' lead signal on lead 368 is the same as the IR signal appearing on lead 230 of FIG. 2A since the tri-state device 621 is always activated when IR' is high.

If the FIFO memory 201 becomes completely full then, as discussed above, the IR signal on lead 368 goes low and remains so, thus disabling tri-state device 321 and preventing any more words from being written into the FIFO memory 201 (FIG.2B) until at least one word has read therefrom.

Waveform 4I shows the signal appearing on OR' lead 340 of FIG. 2 which signal indicates at its low level that the FIFO is completely empty or at its high level indicates that the FIFO is not empty, although it may not be completely full. Since the FIFO memory 201 is empty between $t_0$ and $t_1$ the waveform 4I is at its low level during such time interval $t_0$-$t_1$. At time $t_1$ a word is entered into the FIFO memory 201 and the waveform 4I rises to its high level and remains there until time $t'_1$ when such word is read therefrom by the RO pulse 403 of waveform 4E. At time $t_3$ another word is written into the FIFO memory 201 by WI pulse 401 of waveform 4B so that the waveform 4I rises to its high level at time $t_3$ indicating that memory 201 is not empty.

At time $t'_5$ the waveform 4I drops to its low level when the third word is read from memory 201 by RO pulse 405 of waveform 4E. Since only three words had been written into memory 201, the FIFO memory 201 is now empty and the waveform 4I remains at its low level, thereby prohibiting the reading out of any more words from the FIFO memory since it is empty.

The foregoing discussion of the detailed operation of the writing in and the reading out of words into and from the FIFO memory 201 has been based on the assumption that certain signals were generated within the border transfer logic 33 of FIG. 2, primarily to energize the tri-state devices 321 and 341 and to prime the AND gates 306 and 333. Such signals are identified in the border transfer logic block 287 of FIG. 2 as WIE (write-in enable), IB (inboard) for the write in function and ROE (read-out-enable), OB (outboard), and TSE (tri-state-enable) for the read out function. Reference is made to the legend in FIG. 2B for these and more definitions.

VI. DISCUSSION OF BORDER TRANSFER LOGIC CORRESPONDING TO THE EIGHT CASES OF FIG. 5 (FIG. 12–FIG. 19D)

A detailed description of the operation of the border transfer logic 330 will now be set forth with reference to the thirty-two FIGS. 12A through 19D.

As mentioned above FIGS. 12A through 19D are divided into 8 groups of 4 figures each, with each group of 4 figures illustrating one of the possible combinations of positions of active outboard and inboard pointers when the last word location of a chip in a multi-chip FIFO system is changed, i.e. when a word is transferred into the last address position of one of the FIFO chip memories or a word is transferred out of the last word location of a FIFO chip memory. Such combinations of changes were discussed above generally re cases 1–4 of FIG. 5.

Consider for example, the FIGS. 12A through 12D. FIG. 12A shows a first condition where both the inboard pointer and the outboard pointer are located in chip A of a two chip FIFO consisting of chip A and chip B. As discussed before, the number of FIFO chips can be increased to a much larger number without changing the basic operation of the system.

In FIG. 12A the last word location of chip A is full, as evidenced by the cross-hatched area 399. The outboard pointer $OB_A$ is pointing to such last word location 399 whose stored word is about to be read therefrom as a result of a read out (RO) command from the external system 200 of FIG. 2.

FIG. 12B shows the state of the contents of chip A and chip B and the positions of the active inboard and outboard pointers after the word has been transferred out of the last word location of chip A. It will be noted that the active inboard pointer has now been transferred to chip B and is identified as $OB_B$. The pointer $OB_A$ of chip A has been deactivated.

The logic shown corresponds to FIG. 12C is the border transfer logic within the block 287 of FIG. 2 and is resident in chip A of FIGS. 12A and 12B. Border transfer logic similar to that shown in FIG. 12C will be shown in each of the eight groups of four figures extending from FIG. 12A through 19D since there is one border transfer logic means for each FIFO chip and for two-chip FIFO systems are shown in FIGS. 12A through FIG. 19D.

Stated in another way, each of the two chips, such as chip A and chip B of FIG. 12A, has a separate border transfer logic resident therein and both border transfer logics are identical to the border transfer logic shown in FIG. 12C. Each of these physically identical border transfer logics will, however, produce different inboard and outboard pointer control signals in accordance with the XO and XI input signals supplied thereto and, in this manner, will properly control the activation of the inboard and outboard counter logic of each of the chips. Thus, even though eight border transfer logic means are shown in FIGS. 12A through 19D, there are in fact, only two border transfer control logic means in the two chips A and B. Each of these two border transfer logic means is simply shown in four different states. Each of the eight border transfer logic states will have notations of binary ones and zeros indicating signal levels at various points in each of the border transfer logic means. Further, arrows pointing up or down will indicate transitions from binary 0 to binary 1 or from binary 1 to binary 0, as a word is transferred into out of the last word location of one of the FIFO chip memories.

Chip A has been selected as the FIFO chip in which such change in the last word location occurs in each of the eight possible situations.

Each border transfer logic means has the following six inputs, XI, XO, $\overline{WI}$, $\overline{RO}$, and RO. Further, each border transfer logic means has three outputs IB, OB, and TSE. The subscripts A and B affixed to various input and output terminals of the border transfer logic means indicate to which chip the input or output relates. For example, the terminal $XI_A$ is associated with the first word location of chip A through border transfer logic of FIG. 12C and additional logic shown in FIG. 2.

The terminal $XO_A$ of FIG. 12A is associated with the last word location of chip A through the border transfer logic of FIG. 12C and additional logic shown in FIG. 2.

In the symmetrical relationship the input $XO_A$ of FIG. 12C is shown as connecting the last word location of chip A to the terminal $XI_B$ which is associated by appropriate logic to the first input word location of chip B. Obviously, the level of terminal $XI_A$ will always be the same as the level of terminal $XO_B$, since they are connected directly together. Similarly, the level of terminal $XI_B$ will always be the same as the level of the terminal $XO_A$ since they are also directly connected together. The terminals XI and XO are shown connected to the border transfer logic block 287 of FIG. 2 whose function will become clear with the following description of the logic of FIG. 12C. The border transfer logic of FIG. 12C can be divided generally into two groups of logical elements which interact together in response to signals supplied to the $XI_A$ and $XO_A$ inputs to produce the proper output signals on the three output leads $IB_A$, $OB_A$ and $TSE_A$ (tri-state enable).

It is to be specifically noted that the output signals appearing on the output leads $IB_A$ and $OB_A$ are not the signals which point to specific memory locations in the FIFO. Such signals $IB_A$ and $OB_A$ only determine the particular chip in which the actual memory location pointer control means is activated. The signals which actually point to the memory locations are designated, for example, in FIG. 12A as $IB_{2A}$ and $OB_{3A}$, with the subscripts 2A and 3A meaning that the inboard pointer is pointing to memory location 2A and the outboard pointer is pointing to the last memory location 3A. Thus, the signals $IB_A$ and $OB_A$ of the border transfer logic of FIG. 12C will energize the inboard and outboard pointer control logic of only chip A. The inboard and outboard pointing control logic of chip B will not be energized until the next word to be entered into, or read from, the system occurs in one of the memory locations of chip B. Then the transfer logic of chip B will respond to such condition to energize the proper pointer control logic of chip B. For purposes of simplicity the subscripts defining the particular memory location the inboard and outboard pointers were pointing to were not employed in FIGS. 5–11. The first group of logical elements of FIG. 12C mentioned above consist of three OR gates 452, 453, and 454, the outputs of which are supplied to AND gate 455. The input $XI_A$ is supplied through INVERTER 460 to one of the inputs of two OR gates 453 and 454. The input $XO_A$ is supplied to another pair of OR gates 452 and 453 through lead 470.

The second group of logic elements is also comprised of three OR gates 456, 457 and 458, the outputs of which are supplied to a single AND gate 459. Again the input $XO_A$ is supplied through an INVERTER 461 to one input of OR gates 457 and 458 and the input $XI_A$ is supplied to inputs of another pair of OR gates 456 and 457.

The output of the first group of logic elements is supplied through leads 483 and 430 to the second inputs of OR gates 456 and 452. Similarly, the output of AND gate 459 of the second group of logic elements is supplied via leads 482 and 431 to the second inputs of OR gates 454 and 458.

A chart of the particular set of conditions being considered in FIGS. 12A through 12C is shown in FIG. 12D. More specifically the given states of the various terminals $XI_A$, $XO_A$, $IB_A$, $OB_A$ and $TSE_A$ are shown in the left hand column of FIG. 12D. It is to be noted, as discussed above, that $XO_A$ will be changed from a high level to a low level since the last word in chip A is being transferred therefrom. $XI_A$ will remain a 1 since $XO_B$ remains a 1. The resulting conditions for the various terminals are shown in the right hand column of FIG. 12D labelled "RESULT." It is to be noted that FIGS. 12A through 12D consider only the effects of the transfer of a word out of the last word location of chip A with respect to chip A. Changes resulting from such a transfer from the last word location of chip B will be considered in FIGS. 13A through 13D.

Thus, two of the eight possible sets of conditions are comprised of the changes in the two chips A and B which result from the same common change in the system. Chips A and B simply represent two adjacent chips from one of which the condition of the last word location is changed which results in a change in the position of the active inboard or outboard pointer of the first word location of the next adjacent chip. In FIG. 12C the changing conditions are marked at the various terminals. Thus $XI_A$, in FIG. 12C, initially was and remains a binary 1. $XO_A$ is shown as changing from a binary 1, to a binary 0 since a word is being transferred out of the last word location of chip A. Chip inboard pointer control $IB_A$ is shown as remaining active on chip A, as indicated in FIGS. 12A and 12B. The chip outboard pointer control $OB_A$ is shown as changing from a binary 1 to a binary 0 since the word in the last word location of chip A is being transferred therefrom and the outboard pointer control $OB_A$ thereof is being deactivated to a low level. Output terminal $TSE_A$ is also shown as changing from a high to a low level since the last word location of chip A is being emptied and it is now longer possible to shift a word out of chip A. As can be seen from FIG. 2, terminal TSE is supplied from border transfer logic 287 to the tri-state device 382 and when it is at a low level the transfer of data through tri-state device 382 to the external system 200' is prevented.

Consider now the outputs of the three OR gates 456, 457 and 458. Since the input terminal $XO_A$ is going to a low level the output of INVERTER 461 will go to a high level thereby supplying high levels to an input of both OR gates 457 and 458. The given condition of terminal $XI_A$ is a high level (See FIG. 12D) which is supplied to an input of OR gate 456. Therefore all three OR gates 456, 457, and 458 output a high level output which in turn produces a high level output from AND gate 459, as indicated by the arrow 485 which points upwardly. The lower input to OR gate 453 of the upper logic group of OR gates is a binary 0 since it is directly connected to the input $XO_A$ which is going to its low level. The other input of OR gate 453 is also at a low level since $XI_A$, which is a high level signal, is inverted to a low level signal by INVERTER 460. Therefore at least one OR gate 453 is at its low level so that the output of AND gate 455 is at a low level.

It is to be noted that the output of AND gates 455 and 459 are always of the opposite level of the outputs $IB_A$ and $OB_A$ because the outputs $IB_A$ and $OB_A$ are connected to the inverting $\overline{Q}$ outputs of flip-flops 473 and 475. The flip-flops 473 and 475 are enabled by $\overline{WI}$ and $\overline{RO}$ signals respectively to provide a delay between the time of the transfer of a word into or from the last word location in chip A and the energization of the inboard or outboard logic of chip B. Such delays avoid race conditions.

To illustratve the foregoing reference is made to waveforms 4E, 4F, and 4G of FIG. 4. Words are read out of memory 201 of FIG. 2 at times $t'_1$ and $t'_3$ at the leading edges of pulses 403 and 404 upon the occurrence of an RO signal which also causes the OB counter 335 (FIG. 2) to advance a count, as shown in waveforms 4E and 4F. However, as shown in waveform 4G, the OB pointer does not change until times $t'_2$ and $t'_4$, at the trailing edge of pulses 403 and 404.

It is realized that in prior discussion the read out pulse 403 of waveform 4E was employed in connection with transferring a word out of the first word location of the FIFO chip. However, in the current discussion it is simply being referred to in order to illustrate indicate that the outboard pointer of chip B will not become activated until the read out pulse is terminated, which termination occurs at the trailing edge of the inverted read out pulse $\overline{RO}$, to read out the word in the last word location of the chip A. $\overline{RO}$ is shown as being connected to the enable terminal EN of flip-flop 475 of FIG. 12C. For similar reasons the flip-flop 473 is activated by $\overline{WI}$ to delay the changing of the inboard pointer from one chip to another when a word is being transferred into the last position word location of the given chip.

The invention of the output of AND gates 455 and 459 to produce the proper levels for $IB_A$ and $OB_A$ thus is due to the specific logic arrangement of FIG. 12C, e.g., the use of the Q outputs of flip-flops 473 and 475.

Thus, after the transfer of the word from the last word location of chip A the resulting signal levels of the logic of FIG. 12C are as shown in the "RESULT" column of FIG. 12D. $IB_A$ remains at its high level since it is still pointing to a word location in chip B. $OB_A$ has assumed a low level in chip A since there is now no word in the last location thereof and the OB logic of chip B has been activated as will be discussed in detail below in the discussion of FIGS. 13A through 13D.

It is to be understood that the output signals $IB_A$ and $OB_A$ are not the specific signals which in fact point to the various word locations of a given FIFO chip. $IB_A$ and $OB_A$ are signals which energize additional logic which in turn point to the particular word location of the FIFO memory. For example, in FIG. 2, the IB signal appearing at terminal 325 of border transfer logic 287 corresponds to the $IB_A$ signal on output lead 474 of the logic of FIG. 12C and functions to prime AND gate 306 (FIG. 2) and also to energize tri-state device 621. The WI' output signal of AND gate 306, in turn increments bit counter 308, transfers the stored previous count of counter 308 of the Q outputs of flip-flops 315 and 316, and enables one of AND gates 318 to 321 in a manner described hereinbefore to transfer a word from the external system 200 to a word location of the FIFO memory 201, the word location being selected by the outputs of flip-flops 315 and 316 and 2-to-4 line decoder 317. It can be seen that the actual pointing to or selection of a word location is done by bit counter 308, flip-flops 315 and 316, decoder 317 and the four AND gates 318 to 321.

Referring now to FIGS. 13A through 13D, there is shown the changes occurring at various points in the border transfer logic of FIG. 13C. These changes are similar to those discussed in connection with FIG. 12C, the only difference being that it represents the changes in the border transfer logic of resident in chip B rather than the border transfer logic resident in chip A and has different input signals with resulting different output signals, as indicated in the chart of FIG. 13D.

It is to be noted that there is a separate border transfer logic resident in each FIFO chip in the FIFO system, with each border transfer logic means being identical to all the others. In the present case there are two border transfer logic means since there are two chips A and B. Since the border transfer logic means are identical, similar reference characters are employed to identify similar elements.

The diagrams of FIGS. 13A through 13B are identical with the diagrams of FIGS. 12A and 12B. Before the transfer of the word from the last word location of chip A $XI_B$ is at its low level, a binary 0, and $XO_B$ is at it high level, a binary 1, as indicated at the inputs of the logic of FIG. 13C and also in the chart of FIG. 13D. $IB_B$ initially is a binary 0 and remains so. Output $OB_B$ goes through a transitional stage from binary 0 to a binary 1 as does $TSE_B$, all shown in the chart of FIG. 13D.

It is apparent from an examination of the contents of the word locations in FIG. 13B that the inboard pointer $IB_B$ associated with chip B is a binary 0, i.e. is inactivated and, in fact, is not shown. It is also apparent that the outboard pointer $OB_B$ changes from a binary 0 to a binary 1 in chip B after the word read out occurs.

In FIG. 13C the input $XI_B$ is inverted by INVERTER 460 to supply a binary 1 to one of the inputs of the two OR gates 453 and 454. By definition the input $XO_B$ is a binary 1 which is supplied directly to the third OR gate 452. Thus, all three OR gates 452, 453, and 454 have high level outputs to produce a high level output from AND gate 455 which is inverted, after a time delay, when flip-flop 473 is enabled by the $\overline{WI}$ enable pulse supplied thereto. The $IB_B$ output is generated at the $\overline{Q}$ terminal of flip-flop 473. Thus, it can be seen that the $IB_B$ pointer remains at its low level in chip B.

Consider now the changing state of the outboard pointer OB as it shifts to chip B in FIG. 13B. The output of AND gate 455 is supplied to one input of OR gate 456 thereby producing a high level output therefrom to AND gate 459. The high level input $XO_B$ is inverted by INVERTER 461 to supply low level inputs to both OR gates 457 and 458. A low level input is also supplied to the other input of OR gate 457 from $XI_B$, thereby producing a binary 0 at the output of said OR gate 457. Thus, AND gate 459 will output a low level signal which is inverted to a high level signal when the inverted read out signal $\overline{RO}$ enables flip-flop 475. Thus, the chip outboard pointer control $OB_B$ in chip B is changed from a binary 0 to a binary 1 as indicated on output lead 476. At the occurrence of the leading edge of the read out pulse RO, the flip-flop 478 is enabled to produce a binary 1 on its Q output, which is the $TSE_B$ signal, thereby changing said TSE signal of chip B from a binary 0 to a binary 1 and allowing word read-outs from chip B.

It will be evident at this point that if any of the three OR gates 452, 453, or 454 output a binary 0 then the output of AND gate 455 will be a binary 0 and, after inversion by flip-flop 473, will cause the IB inboard pointer to the associated chip to be activated. Similarly, if any one of the three OR gates 456, 457 or 458 output a binary 0 then AND gate 459 will output a binary 0 and, after inversion by flip-flop 475, will cause the $OB_B$ outboard pointer control to be activated.

On the other hand, if all three OR gates 452, 453, and 454 output binary 1's then the output of AND gate 455 will be a binary 1 and after inversion by flip-flop 473 will cause the $IB_B$ inboard pointer control of the associated chip to be a binary 0, i.e. inactivated.

A similar result occurs when the three OR gates 456, 457 and 458 all output binary 1's to cause AND gate 459 to output a binary 1 which, when inverted by flip-flop 475, causes the $OB_B$ outboard pointer control to be a binary 0, i.e. the outboard pointer for that chip will be inactivated. The TSE signal from the output of flip-flop 478 is always the same level as that of the outboard pointer since it is taken from the Q output of flip-flop 479. However, the TSE signal assumes its level upon the occurrence of the leading edge of the RO signal rather than upon the trailing edge of RO, which enables flip-flop gate 475 to produce the $OB_B$ outboard pointer logic level.

Referring now to FIGS. 14A through 14D, there is shown the situation where the outboard pointer $OB_A$ is initially activated in chip A and the inboard pointer $IB_B$ is initially activated in chip B. These initial conditions are shown in the "GIVEN" column of FIG. 14D. After the word in the last location of chip A is transferred therefrom to produce the situation shown in FIG. 14B, both the outboard and the inboard pointer logic will be activated in chip B so that neither the inboard or outboard pointer will be activated in chip A, as indicated in the "RESULT" column of FIG. 14D. To produce the binary 0 logic levels for the inboard and outboard pointers of chip A, it is necessary that all of the six OR gates 452-454 and 456-458 output binary 1's after the word read-out occurs. Since the input $XO_A$ is initially a binary 1 and then changes to a binary 0, the INVERTER 461 will output a binary 1, thereby outputting binary 1's from OR gates 457 and 458.

The low level input $XI_A$ is inverted to a high level signal by INVERTER 460 to produce binary 1's at inputs of the two OR gates 453 and 454. Further, by definition, $IB_A$ is a binary 0 so that output of AND gate 455 is necessarily a binary 1 which is supplied to one input of OR gate 452. Thus, all three OR gates 452, 453, and 454 output binary 1's to cause a binary 1 output from AND gate 455 which, when inverted by flip-flop 473, causes $IB_A$ to remain a binary 0.

The $XO_A$ input changes from a binary 1 to a binary 0 to produce a high level input from INVERTER 461, thereby causing OR gates 457 and 458 to output binary 1's. The output of AND gate 455, described above to have a high level output, is supplied to OR gate 456 so that all three OR gates 456, 457 and 458 output high level signals to produce a high level output (a binary 1) from AND gate 459 which, when inverted by flip-flop 475, causes the outboard pointer $OB_A$ of chip A to change from a binary 1 to a binary 0.

FIGS. 15A through 15D have the same initial conditions as FIGS. 14A through 14D except they consider the changes occurring in the border transfer logic associated with chip B rather than with chip A. Thus, the border transfer logic of FIG. 15C is that border transfer logic resident in chip B and has initial $XI_B$ and $XO_B$ inputs of a binary 1 and a binary 0, respectively. During the reading out of the word from the last word location of chip A, $XO_A$ changes to a binary 0 to cause $XI_B$, which is connected directly to $XO_A$, to also change to a binary 0.

One input of OR gate 452 has a binary 0 supplied to one input thereof from input $XO_B$. The other input to OR gate 452 also has a binary 0 supplied thereto from the output of AND gate 455 which, by definition of initial conditions, must be a binary 0 to cause $IB_B$ to be a binary 1 (and remains a binary 1) after inversion by flip-flop 473. Since the output of AND gate 455 is initially a binary 0 which is supplied to one input of OR gate 452 and the other input of OR gate 452 also has a binary 0 supplied thereto, the AND gate 455 will remain a binary 0.

OR gate 456 has a binary 0 supplied to the upper input thereof from the output of AND gate 455, and another binary 0 supplied to the second input thereof after $XI_B$ changes from a binary 1 to a binary 0. Therefore, the output of OR gate 456 is a binary 0 so that the output of AND gate 459 must also be a binary 0 which, after inversion by flip-flop 475, becomes a binary 1 indicating that the outboard pointer OB in chip B has become activated. As mentioned above, the $TSE_B$ output signal appearing on lead 479 from the Q output of flip-flop 478 changes from a binary 0 to a binary 1 when flip-flop 478 is enabled by the read out RO signal supplied to the enable terminal EN thereof. The high level $TSE_B$ signal enables a word to be transferred from chip B.

Referring now to FIGS. 16A-16D there is shown the fifth possible permutation of the positions of the inboard and outboard pointers and specifically shows the change in chip A when a word is transferred into the last location thereof by $IB_A$. As can be seen from the chart of FIG. 16D, $XO_A$ is equal to a binary 0 about to change to a binary 1 when the word is written into the last word location of chip A. Both the inboard and outboard pointers $IB_A$ and $OB_A$ are activated in the chip A logic.

Thus, initially in FIG. 16C, input terminal $XI_A$ is a binary 0, and $XO_A$ is also a binary 0 which changes to a binary 1 as stated above. The low level (binary 0) input $XI_A$ is inverted to a high level signal (binary 1) by INVERTER 460 so that binary 1's appear at the output of OR gates 453 and 454. As $XO_A$ changes from a binary 0 to a binary 1, a binary 1 is supplied to the third OR gate 452, thereby making the outputs of all three OR gates 452, 453, and 454 binary 1's to cause AND gate 455 to also output a binary 1 which is subsequently inverted to a binary 0 when flip-flop 473 is enabled by $\overline{WI}$. The signal from the $\overline{Q}$ output ($IB_A$) of flip-flop 473 is thus a binary 0 as expected since the active inboard pointer is transferred from chip A to chip B.

The OR gate 457 has binary 0's on both of its inputs after the word is transferred from the last location of chip A, thereby making the output of AND gate 459 a binary 0 which is inverted to a binary 1 when flip-flop 475 is enabled by signal $\overline{WO}$. thus, $OB_A$ remains enabled in chip A. Further, $TSE_A$ remains enabled since it assumes the same values as $OB_A$.

Referring now to FIGS. 17A-17D there are shown the same initial conditions as shown in FIGS. 16A-16D except that in FIGS. 17A-17D the border transfer logic of chip B will be considered. Initially $XI_B$ is a binary 0 which changes to a binary 1 after the transfer of the word from the last location of chip A. $XO_B$ is initially a binary 0 since there is no word in the last word location of chip B. OR gate 453 outputs a binary 0 since binary 0's are supplied to both of its inputs. More specifically, the input derived from terminal $XO_B$ is a binary 0 which goes to one input of OR gate 453, and $XI_B$ changes from a binary 0 to a binary 1 which is inverted by INVERTER 460 to supply a binary 0 to the other input of OR gate 453. Therefore, the output of AND gate 455 is a binary 0 which is inverted to a binary 1 when flip-flop 473 is enabled by the $\overline{WI}$ signal. Thus, $IB_B$ changes from a binary 0 to a binary 1 during the writing in of a word into the last location of chip A.

All three OR gates 456, 457, and 458 of FIG. 17C output binary 1's so that AND gate 459 also outputs a binary 1. More specifically, when $XI_B$ goes from a low to a high level a binary 1 is supplied to OR gates 456 and 457. Since $XO_B$ initially is a binary 0, the INVERTER 461 will output a binary 1 to OR gates 457 and 458, thus making all three OR gates output a binary 1. The resulting binary 1 output from AND gate 459 is inverted when flip-flop 475 is enabled by signal $\overline{RO}$ so that its output $OB_B$ remains a binary 0, indicating that the outboard pointer logic in chip B is inactivated.

Referring now to FIGS. 18A–18D there is shown the situation where a word is being transferred into the last word location of chip A and $OB_B$ is active in chip B. $XO_A$ changes from a binary 0 to a binary 1 as a word is transferred into the last word location of chip A. As shown in FIG. 18C, which shows the border transfer logic of chip A, the binary 1 of input $XI_A$ is supplied to OR gates 456 and 457 via lead 471. Since $OB_A$ initially is a binary 0, as given in the chart of FIG. 18D, OR gate 458 has a binary 1 supplied to one input thereof. Thus, all three OR gates 456, 457 and 458 output binary 1's so that AND gate 459 also outputs a binary 1 which is inverted to a binary 0 when flip-flop 475 is enabled by RO. Thus, the outboard pointer logic of chip A remains disabled ($OB_A=0$). $IB_A$ changes to a binary 0.

Figures 19A, 19B, 19D:
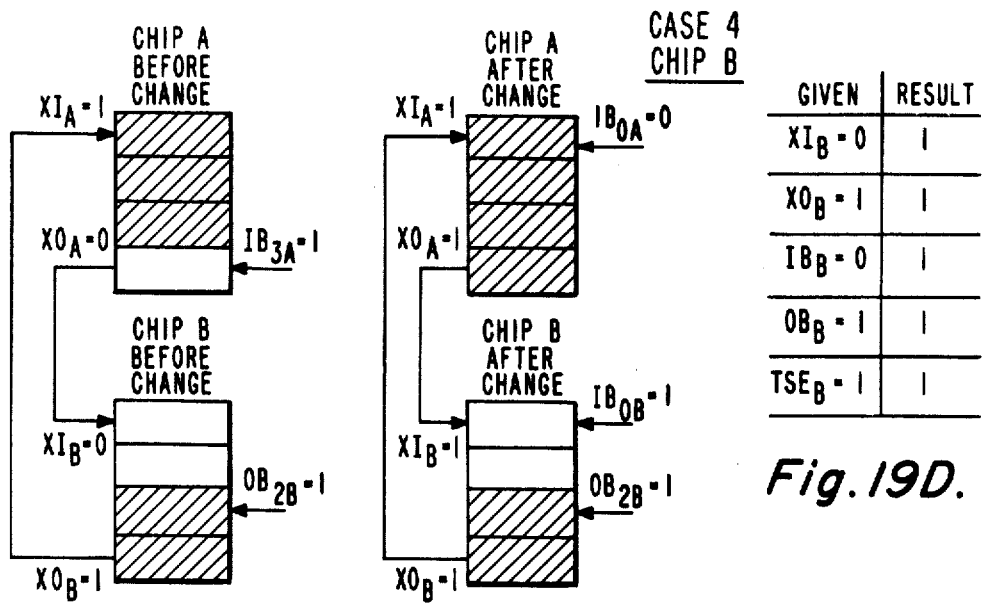

Referring now to FIGS. 19A–19D, there is shown the same conditions as existed in FIGS. 18A–18D. However, in FIGS. 19A–19D, the changes in the chip B border transfer logic will be considered. In FIG. 19D it is given that $XI_B$ changes from a binary 0 to a binary 1 as a word is written into the last location of chip A. Also, it is given that $XO_B$ remains a binary 1. After the write in occurs the output of INVERTER 460 will be a binary 0 which is supplied to one input of each of OR gates 453 and 454. The other input of OR gate 454 also has a binary 0 supplied thereto from the output of AND gate 459 which remains a binary 0 both before and after the word write in, since $OB_B$ remains a binary 1.

Figure 19C:
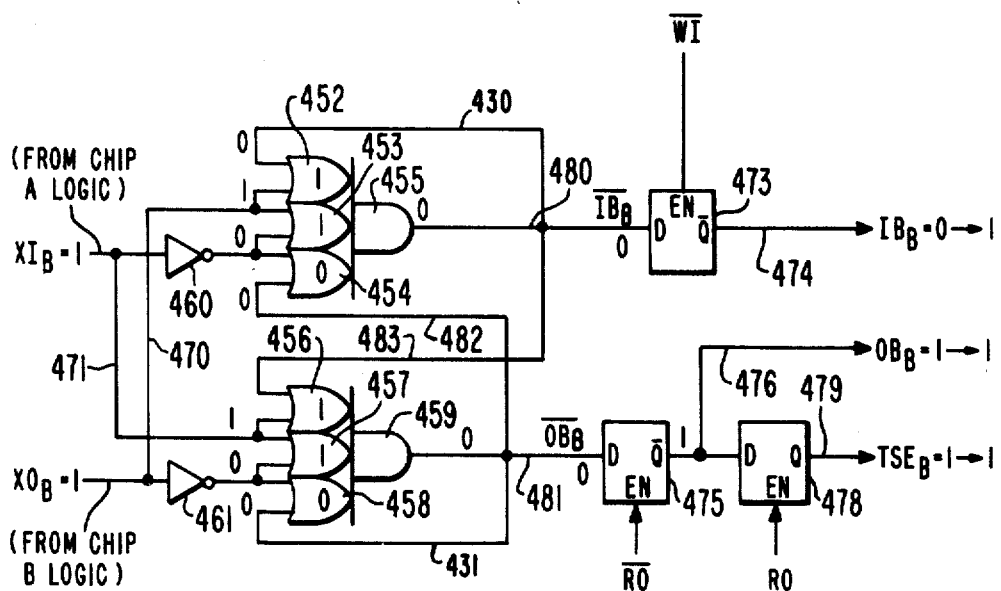

Thus, OR gate 454 outputs a binary 0 so that AND gate 455 also outputs a binary 0 which is inverted to a binary 1 by flip-flop 473 when enabled by signal $\overline{WI}$. The $\overline{Q}$ output of flip-flop 473 is $IB_B$ as indicated in FIG. 19C. The $XO_B$ input is inverted from a binary 1 to a binary 0 by INVERTER 461, thus supplying a binary 0 to one input of OR gate 458. The output of AND gate 459 is also a binary 0 and is supplied to the other input of OR gate 458, thus causing OR gate 458 to output a binary 0 which will cause the output of AND gate 459 to remain a binary 0. Thus, $OB_B$ remains a binary 1.

The discussion of the eight possible permutations of the positions of the inboard and outboard pointers when a word is transferred into or out of the last location of one of the chips has now been completed.

VII. DISCUSSION OF BORDER TRANSFER LOGIC RE THE INITIATION OF OPERATION OF THE SYSTEM (FIG. 20A–FIG. 21D)

Referring now to FIGS. 20A through 20D, there is shown the means for initiating operation of the system which comprises the steps of first clearing all the counters, latches and the word locations of the FIFO chip memories with a reset pulse 505 (also shown as pulse 410 in waveform 4A). The chips A and B are shown in some arbitrary stage of operation in FIG. 20A and then are shown in a cleared condition in FIG. 20B, with all the word locations being emptied and with the IB and the OB pointers both pointing at the first word location of chip A. Chip A has been selected as the chip in which the first word is to be written upon initiation of operation of the system by logic described below.

Figures 20A, 20B, 20D:
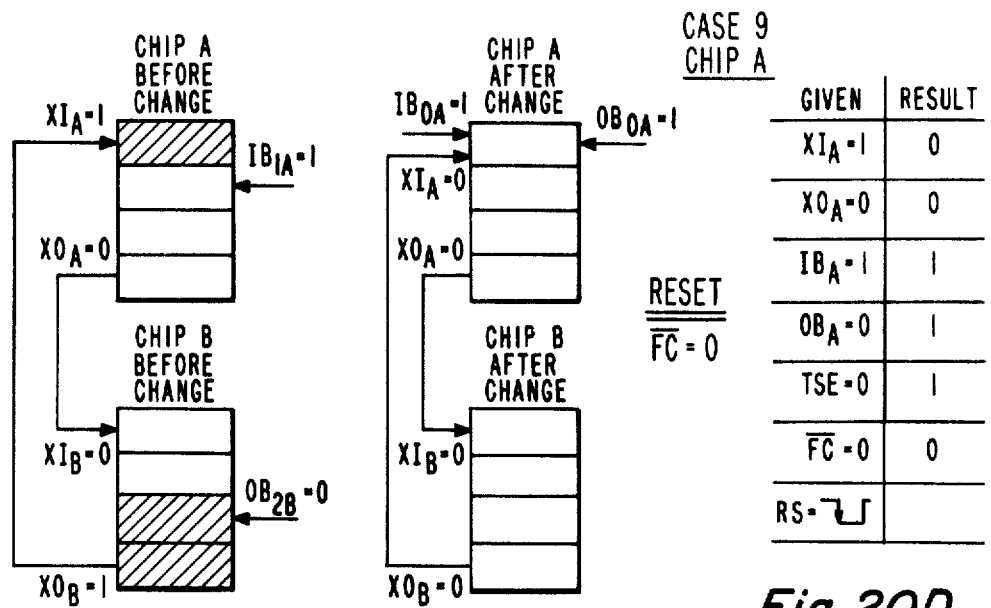
Figure 20C:
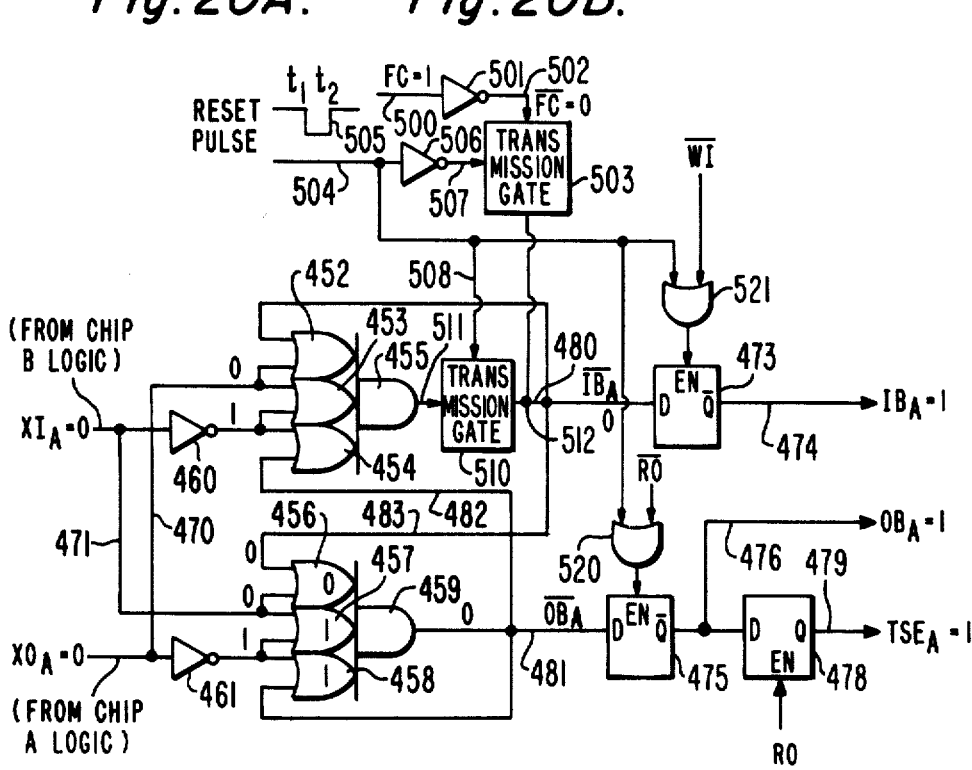

Reference is made to logic shown in FIG. 20C and specifically including INVERTERS 501 and 506 and TRANSMISSION gates 503 and 510. The value of signal FC is always equal to a binary 1 and is inverted by INVERTER 501 only in the border transfer logic associated with chip A to produce a signal $\overline{FC}$ which is a binary 0 and which is supplied to TRANSMISSION gate 503. The reset pulse 505 is supplied via input lead 504 through INVERTER 506 to enable TRANSMISSION gate 503 to pass $\overline{FC}$ therethrough and through point 512 to the data input D of flip-flop 473.

The reset pulse 505, which is a negative pulse, at the same time disables TRANSMISSION gate 510. The binary 0 supplied from TRANSMISSION gate 503 to point 512 is inverted by flip-flop 473 when flip-flop 473 is enabled by the trailing edge of reset pulse 505 through OR gate 521, thereby causing $IB_A$ to become a binary 1. Thus, the inboard pointer logic of chip A is activated. Since the write in counter 308 (FIG. 2) of the logic associated with chip A has already been set to a binary 0, the inboard pointer of chip A will be pointing at the first word position of chip A.

The $OB_A$ output of FIG. 20C is set to a binary 1 at the initiation of operation of the system in the following manner. One input to OR gate 456 has a binary 0 supplied thereto from the $XI_A$ input. When the point 512 at the output of TRANSMISSION gate 510 changes to a binary 0 in the manner described above, the other input of OR gate 456 will also have a binary 0 supplied thereto via lead 483 from point 512. Thus, the output of AND gate 459 will also be a binary 0 so that when flip-flop 475 is enabled by the positive-going trailing edge of reset pulse 505, supplied thereto through OR gate 520 at time $t_2$, the output of flip-flop 475 will be a binary 1. Thus, the outboard pointing logic of chip A is activated and, since the read out counter 335 of FIG. 2 is reset to zero, the outboard pointer will be pointing to the first word location of chip A.

All of the remaining FIFO chips must have their inboard and outboard pointer logic means disabled when operation of the FIFO system is first initiated. The disabling of the pointer logic of said remaining chips which, in the case of FIGS. 20B and 21B, consists of a single chip B since it is a two chip system. However, if there were additional chips in the system, such additional chips would also have their inboard and outboard pointer logic means disabled in the manner shown in FIGS. 21A–21D, which shows the border transfer logic associated with chip B.

The means for disabling the inboard and outboard pointer logic means of chip B includes the reset pulse 505 being supplied via lead 504 through INVERTER 506 to enable TRANSMISSION gate 503, a high level FC signal being supplied through TRANSMISSION gate 503 to point 512, and a second TRANSMISSION gate 510. The second TRANSMISSION gate 510 presents a high impedance between AND gate 455 and point 512 during the disabling of the inboard and outboard pointer logic of chip B which occurs during the reset pulse 505.

The negative-going leading edge of reset pulse 505 is inverted by INVERTER 506 to pass a binary 1 through TRANSMISSION gate 503 to the point 512. The uninverted negative reset pulse 505 is supplied directly to TRANSMISSION gate 510 to disable it, thereby isolating point 512 from the output of AND gate 455. The binary 1 appearing at point 512 is inverted when flip-flop 473 is enabled by the positive-going trailing edge of reset pulse 505 at time $t_2$, thereby inverting the binary 1 appearing at point 512 to a binary 0 at the $\overline{Q}$ output of flip-flop 473. Thus, the inboard pointer $IB_B$ of chip B is a binary 0 and therefore disabled. The outboard pointer $OB_B$ and $TSE_B$ output 479 are also disabled since all of the three OR gates 456, 457 and 458 output binary 1's to AND gate 459 which, in turn, outputs a binary 1. Such binary 1 is inverted by flip-flop 475 when it is enabled by the positive-going trailing edge of reset pulse 505 at time $t_2$.

Other specific border transfer logic means to monitor the inboard and outboard pointer means can be devised by persons skilled in the art as well as means other than that shown in FIG. 2 to determine whether a particular FIFO chip is full or empty.

What is claimed is:

1. A FIFO system comprising an exandable number N of FIFO chips arranged to form a ring of identical FIFO chips connected in an identical manner and with each FIFO chip comprising:

a RAM memory having N word storage locations;

inboard pointing means which, when activated, points to, and directs the writing of words into, successive ones of said word storage locations with each word remaining in its word storage location until read out of the FIFO system;

outboard pointing means which, when activated, points to, and directs the reading of words from, successive ones of said word storage locations;

first control means responsive to the presence or absence of a word in the last word location in the RAM memory in any given FIFO chip to produce a first signal $XO_n = 1$ or a second signal $XO_n = 0$, respectively;

second control means responsive to the presence or absence of a word in the last word location in the RAM memory in the FIFO chip immediately preceding said given FIFO chip in the ring of FIFO chips to produce a third signal $XO_{n-1} = 1$ and a fourth signal $XO_{n-1} = 0$, respectively;

border transfer logic means resident in said each FIFO chip and connecting said each FIFO chip with the immediately preceding FIFO chip in said ring of FIFO chips and responsive to the presence of a word in the last word location in said preceding FIFO chip RAM memory ($XO_{n-1} = 1$) to activate said inboard printing means in said given FIFO chip only when $XO_n = 0$ and to deactivate said inboard pointing means in said given FIFO chip when $XO_n = 1$ and further responsive to the absence of a word in the last word location in said preceding FIFO chip RAM memory ($XO_{n-1} = 0$) to activate said outboard pointing means in said given FIFO chip when $XO_n = 1$, and to deactivate said outboard pointing means in said given FIFO chip when $XO_n = 0$.

2. A FIFO system as in claim 1 in which said inboard pointing means and said outboard pointing means of each FIFO chip comprise:

first and second counting means responsive, respectively, to the writing in or reading out of a word from the RAM memory of said each FIFO chip, to be incremented by a count of one, with each counting means having $X + 1$ bit position stages with a count capacity of $2^{X+1}$, where $2^X = N$; and in which said FIFO system further comprises:

first comparing means responsive to the coincidence of the contents of the two least significant bit positions of said first and second counting means to produce a first comparing signal;

second comparing means responsive to the coincidence or non-coincidence between the most significant bit position of said first and second counting means to produce second and third comparing signals, respectively; and gating means responsive to the coincident occurrence of said first comparing signal and said second comparing signal to produce a fourth output signal indicating the FIFO system is completely empty of words;

said gating means further responsive to the coincident occurrence of said first signal and said third signal to produce a fifty output signal indicating the FIFO system is completely filled with words.

3. A FIFO system as in claim 1 in which each FIFO chip further comprises:

first logic means including said first control means responsive to an activated inboard pointing means of said preceding FIFO chip overtaking an activated outboard pointing means of said given FIFO chip to indicate that all the word storage locations of said FIFO system have been filled and that no more words can be written therein until at least one word has been read therefrom; and said first logic means being further responsive to an activated outboard pointing means of said preceding FIFO chip overtaking an activated inboard pointing means of said given FIFO chip to indicate that all the word storage locations of said FIFO system have been emptied and that no more words can be read therefrom until at least one more word has been written therein.

4. A FIFO system as in claim 3 in which said inboard pointing means and said outboard pointing means of each FIFO chip comprise:

first and second counting means, respectively, with each counting means having $X + 1$ bit position stages with a count capacity of $2^{X+1}$, where $2^X = N$; and in which said first logic means comprises:

first comparing means responsive to the coincidence of the contents of the two least significant bit positions of said first and second counting means to produce a first comparing signal;

second comparing means responsive to the coincidence or non-coincidence between the most significant bit position of said first and second counting means to produce second and third comparing signals, respectively;

gating means responsive to the coincident occurrence of said first comparing signal and said second comparing signal to produce a fourth output signal indicating the FIFO system is completely empty of words; and said gating means further responsive to the coincident occurrence of said first comparing signal and said third comparing signal to produce a fifth output signal indicating the FIFO system is completely filled with words.

5. A FIFO system as in claim 1 in which said inboard pointing means of each FIFO chip comprises:

counting means having at least X bit position stages, where $2^X = N$, and being incremented by a count of X one each time a word is written into any given word location of the RAM memory of said each FIFO chip to then contain a count corresponding to the next word location following said given word location;

a first plurality of gating means which, when energized in a given order, enable the writing of words into successive ones of said word locations;

storage means for storing the count contained in said counting means for a time period δ which terminates prior to another word being written into said RAM memory; and second logic means comprising decoding means responsive to each successive count stored in said storage means during each of said time periods δ to energize each of said gating means in said given order.

6. A FIFO system as in claim 1 in which said outboard pointing means of each FIFO chip comprises:

counting means having at least X bit position stages, where $2^X = N$, and being incremented by a count of one each time a word is read out of any given word location of the RAM memory of said FIFO chip to then contain a count corresponding to the next word location following said given word location;

a first plurality of gating means which, when energized in a given order, enable the reading of words out of successive ones of said word locations;

storage means for storing the count contained in said counting means for a time period δ which terminates prior to another word being read out of said RAM memory; and second logic means comprising decoding means responsive to each successive count stored in said storage means during each of said time periods δ to energize each of said gating means in said given order.

7. In a data processing system requiring memory means for storing and retrieving data in a first in, first out (FIFO) order and having means for generating write in and read out instruction signals for writing words into or reading words from said memory means, a FIFO system comprising an expandable number of identical FIFO chips connected in identical manner to form a ring of FIFO chips with each chip comprising:

a write in, read out memory having a plurality of word storage locations;

inboard pointing means and outboard pointing means which, when activated, direct the writing in or reading out, respectively, or words into successive ones of said word storage locations with each written word remaining in the word storage location written into until read out from the system; and logic means including border transfer logic means connecting said each FIFO chip with the immediately preceding FIFO chip in said ring of FIFO chips and responsive to the presence or absence of words in both of the last word locations of said each FIFO chip memory and said preceding FIFO chip memory to inactivate said inboard or outboard pointing means, respectively, of said each FIFO chip and to deactivate the said inboard or outboard pointing means, respectively, of said preceding FIFO chip.

8. A FIFO system as in claim 7 in which:

said logic means is further responsive to the active inboard pointing means of said each FIFO chip over-taking activated outboard pointing means of said each FIFO chip to indicate that all the word storage locations of said FIFO system have been filled; and in which said logic means is still further responsive to said active outboard pointing means overtaking the activated inboard pointing means to indicate that all the word storage locations of said FIFO system have been emptied.

9. A FIFO system as in claim 8 in which said inboard pointing means and said outboard pointing means of each FIFO chip comprise:

first and second counting means, respectively, with each counting means having $X+1$ position stages with a count capacity of $2^{X+1}$, where $2^X = N$; and in which said logic means further comprises:

first comparing means responsive to the coincidenct between the contents of the two least significant bit positions of said first and second counting means to produce a first signal;

second comparing means responsive to the coincidence and non-coincidence between the most significant bit positions of said first and second counting means to produce second and third signals, respectively;

gating means responsive to the coincident occurrence of said first and second signals to produce a fourth signal indicating the FIFO system is completely empty of words; and said gating means further responsive to the coincident occurrence of said first and third signals to produce a fifth signal indicating the FIFO system is completely filled with words.

* * * * *

UNITED STATES PATENT AND TRADEMARK OFFICE
CERTIFICATE OF CORRECTION

PATENT NO. : 4,374,428

DATED : 2-15-83

INVENTOR(S) : Kerry Brian Barnes

It is certified that error appears in the above-identified patent and that said Letters Patent is hereby corrected as shown below:

On the title page:
In the Abstract, line 13, delete "each" and insert --the succeeding--.

Col. 3, line 29, delete "the", first occurrence.

Col. 11, line 17, "known" should be --know--.

Col. 12, line 32, "336" should be --335--.

Col. 13, line 50, "336 " should be --335--.

Col. 14, line 20, "336" should be --335--.

Col. 18, line 3, "RO" should read --RO'--.

Col. 20, line 14, delete "is" and insert --corresponds to--.

Col. 20, line 20, "for" (second occurrence) should be --four--.

Col. 23, line 2, delete "indicate".

Col. 29, lines 39-40, "printing" should be --pointing--.

Col. 30, line 8, "fifty" should be --fifth--.

Signed and Sealed this

Fifth Day of July 1983

[SEAL]

Attest:

GERALD J. MOSSINGHOFF

*Attesting Officer*  *Commissioner of Patents and Trademarks*